(12) United States Patent
Tomaru

(10) Patent No.: US 8,994,727 B2
(45) Date of Patent: Mar. 31, 2015

(54) MAP SYMBOL DRAWING DEVICE

(75) Inventor: Yoshihiro Tomaru, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 251 days.

(21) Appl. No.: 13/824,022

(22) PCT Filed: Nov. 9, 2010

(86) PCT No.: PCT/JP2010/006564
§ 371 (c)(1),
(2), (4) Date: Mar. 15, 2013

(87) PCT Pub. No.: WO2012/063279
PCT Pub. Date: May 18, 2012

(65) Prior Publication Data
US 2013/0176307 A1 Jul. 11, 2013

(51) Int. Cl.
*G06T 17/10* (2006.01)
*G06T 15/04* (2011.01)
*G01C 21/36* (2006.01)

(52) U.S. Cl.
CPC ............... *G06T 17/10* (2013.01); *G06T 15/04* (2013.01); *G01C 21/367* (2013.01)
USPC ...................................... 345/420

(58) Field of Classification Search
None
See application file for complete search history.

(56) References Cited

U.S. PATENT DOCUMENTS 6,002,407 A * 12/1999 Fadden ............................. 345/582
6,577,330 B1 6/2003 Tsuda et al.
2004/0054568 A1* 3/2004 Bradley et al. ...................... 705/7
2004/0176908 A1* 9/2004 Senda et al. ..................... 701/211
2006/0119599 A1* 6/2006 Woodbury, Jr. ............... 345/420

FOREIGN PATENT DOCUMENTS

| JP | 3 138779 | 6/1991 |
|---|---|---|
| JP | 5 242181 | 9/1993 |
| JP | 2009 45091 | 3/2009 |
| JP | 2009 238192 | 10/2009 |

OTHER PUBLICATIONS

Office Action issued Nov. 6, 2014 in German Patent Application No. 11 2010 005 982.9 (with English translation).
Robert Chow, Posts Tagged 'Texture Atlas', "glGenTexture(Atlas);// part 2", Mar. 2010, 9 pages URL http://slizerboy.wordpress.com/tag/texture-atlas/.
Online encyclopedia "Wikipedia", article on the term "Texture mapping", Oct. 20, 2010, 5 pages URLhttp:// en.wikipedia.org/w/index.php?title=Texture_mapping&oldid=391758682.
Online encyclopedia "Wikipedia", article on the term "Texture atlas" Oct. 25, 2010, 1 page URLhttp:// en.wikipedia.org/w /index.php?title=Texture atlas &oldid=392791276.
International Search Report Issued Dec. 14, 2010 in PCT/JP10/06564 Filed Nov. 9, 2010.

* cited by examiner

*Primary Examiner* — Kee M Tung
*Assistant Examiner* — Grace Q Li
(74) *Attorney, Agent, or Firm* — Oblon, McClelland, Maier & Neustadt, L.L.P.

(57) ABSTRACT

A symbol cache checking part for checking to see whether or not an image of a symbol of the same type as a symbol to be drawn is written in a texture. When the symbol cache checking part determines that an image of a symbol of the same type as the symbol to be drawn is written in a texture, a texture coordinate setting part sets the write position of the above-mentioned symbol in the texture to the vertices of a 3D polygon generated by a polygon generating part as texture coordinates, and a polygon drawing unit 40 draws this 3D polygon.

9 Claims, 21 Drawing Sheets

| Symbol Type | Use Count |
|---|---|
| Symbol 1 | 3 |
| Symbol 2 | 80 |
| Symbol 3 | 1 |
| Symbol 4 | 100 |
| Symbol 5 | 40 |
| Symbol 6 | 50 |
| Symbol 7 | 5 |
| Symbol 8 | 20 |
| Symbol 9 | 2 |
| Symbol 10 | 0 |
| ⋮ | |
| Symbol 1000 | 0 |

| Drawing Data Number | Symbol Type | Window Coordinate |
|---|---|---|
| 0 | Symbol 4 | (100, 200) |
| 1 | Symbol 6 | (400, 300) |
| 2 | Symbol 4 | (200, 800) |
| 3 | Symbol 8 | (100, 500) |
| 4 | Symbol 10 | (600, 100) |
| 5 | Symbol 2 | (700, 500) |

| Symbol Type | Use Count |
|---|---|
| Symbol 4 | 100 |
| Symbol 2 | 80 |
| Symbol 6 | 50 |
| Symbol 5 | 40 |
| Symbol 8 | 20 |
| Symbol 7 | 5 |
| Symbol 1 | 3 |
| Symbol 9 | 2 |
| Symbol 3 | 1 |
| Symbol 10 | 0 |
| ⋮ | |
| Symbol 1000 | 0 |

FIG.9
| Cache Number | Symbol Type | Texture Index | Upper Left Coordinates | Lower Right Coordinates |
|---|---|---|---|---|
| 0 | Symbol 4 | 0 | (0, 0) | (100, 100) |
FIG.10
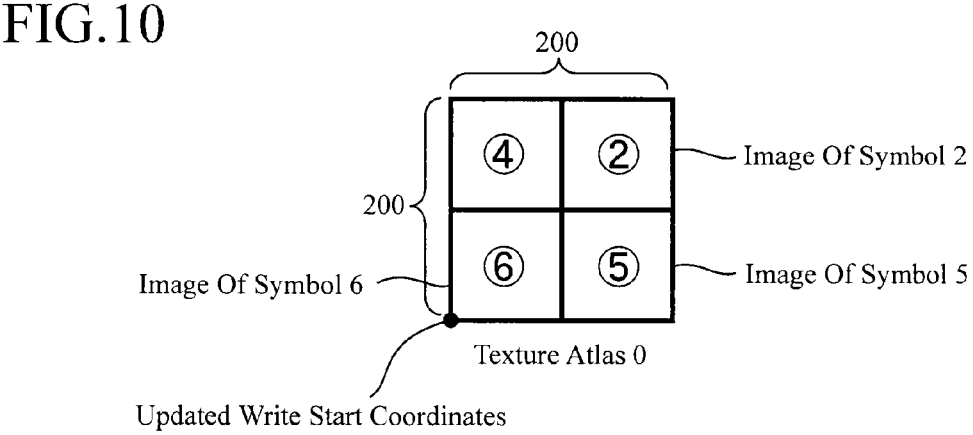
FIG.11
| Cache Number | Symbol Type | Texture Index | Upper Left Coordinates | Lower Right Coordinates |
|---|---|---|---|---|
| 0 | Symbol 4 | 0 | (0, 0) | (100, 100) |
| 1 | Symbol 2 | 0 | (100, 0) | (200, 100) |
| 2 | Symbol 6 | 0 | (0, 100) | (100, 200) |
| 3 | Symbol 5 | 0 | (100, 100) | (200, 200) |
FIG.12
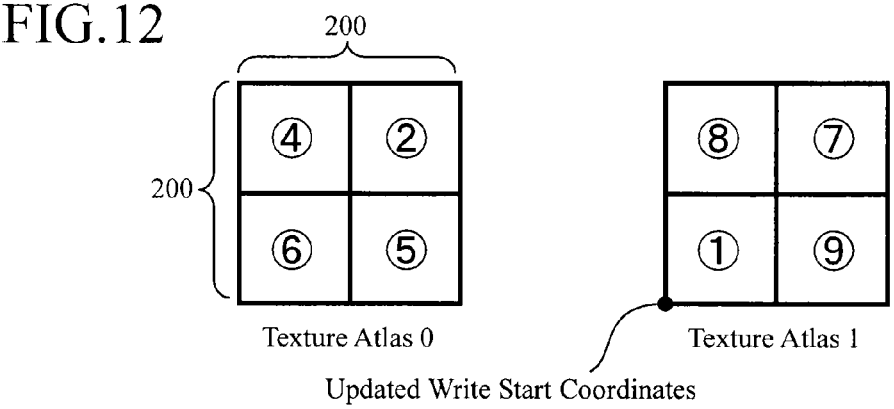

| Cache Number | Symbol Type | Texture Index | Upper Left Coordinates | Lower Right Coordinates |
|---|---|---|---|---|
| 0 | Symbol 4 | 0 | (0, 0) | (100, 100) |
| 1 | Symbol 2 | 0 | (100, 0) | (200, 100) |
| 2 | Symbol 6 | 0 | (0, 100) | (100, 200) |
| 3 | Symbol 5 | 0 | (100, 100) | (200, 200) |
| 4 | Symbol 8 | 1 | (0, 0) | (100, 100) |
| 5 | Symbol 7 | 1 | (100, 0) | (200, 100) |
| 6 | Symbol 1 | 1 | (0, 100) | (100, 200) |
| 7 | Symbol 9 | 1 | (100, 100) | (200, 200) |

Window Coordinate System Of Display

Window Coordinate System Of Display

Window Coordinate System Of Display

Window Coordinate System Of Display

FIG.23

Use Count Of 100-m Scale

| Symbol Type | Use Count |
|---|---|
| Symbol 1 | 20 |
| Symbol 2 | 50 |
| Symbol 3 | 80 |
| Symbol 4 | 100 |
| Symbol 5 | 40 |
| Symbol 6 | 0 |
| Symbol 7 | 0 |
| Symbol 8 | 0 |
| Symbol 9 | 0 |
| Symbol 10 | 0 |
| ⋮ | ⋮ |
| Symbol 1000 | 0 |

Use Count Of 200-m Scale

| Symbol Type | Use Count |
|---|---|
| Symbol 1 | 0 |
| Symbol 2 | 0 |
| Symbol 3 | 0 |
| Symbol 4 | 0 |
| Symbol 5 | 100 |
| Symbol 6 | 10 |
| Symbol 7 | 90 |
| Symbol 8 | 50 |
| Symbol 9 | 70 |
| Symbol 10 | 0 |
| ⋮ | ⋮ |
| Symbol 1000 | 0 |

100-m Scale

| Symbol Type | Use Count |
|---|---|
| Symbol 4 | 100 |
| Symbol 3 | 80 |
| Symbol 2 | 50 |
| Symbol 5 | 40 |
| Symbol 1 | 20 |
| Symbol 6 | 0 |
| Symbol 7 | 0 |
| Symbol 8 | 0 |
| Symbol 9 | 0 |
| Symbol 10 | 0 |
| ⋮ | ⋮ |
| Symbol 1000 | 0 |

200-m Scale

| Symbol Type | Use Count |
|---|---|
| Symbol 5 | 100 |
| Symbol 7 | 90 |
| Symbol 9 | 70 |
| Symbol 8 | 50 |
| Symbol 6 | 10 |
| Symbol 1 | 0 |
| Symbol 2 | 0 |
| Symbol 3 | 0 |
| Symbol 4 | 0 |
| Symbol 10 | 0 |
| ⋮ | ⋮ |
| Symbol 1000 | 0 |

| Cache Number | Symbol Type | Texture Index | Upper Left Coordinates | Lower Right Coordinates |
|---|---|---|---|---|
| 0 | Symbol 4 | 0 | (0, 0) | (100, 100) |
| 1 | Symbol 3 | 0 | (100, 0) | (200, 100) |
| 2 | Symbol 2 | 0 | (0, 100) | (100, 200) |
| 3 | Symbol 5 | 0 | (100, 100) | (200, 200) |
| 4 | Symbol 1 | 1 | (0, 0) | (100, 100) |

Texture Atlas 0   Texture Atlas 1

| Cache Number | Symbol Type | Texture Index | Upper Left Coordinates | Lower Right Coordinates |
|---|---|---|---|---|
| 0 | Symbol 5 | 0 | (0, 0) | (100, 100) |
| 1 | Symbol 7 | 0 | (100, 0) | (200, 100) |
| 2 | Symbol 9 | 0 | (0, 100) | (100, 200) |
| 3 | Symbol 8 | 0 | (100, 100) | (200, 200) |
| 4 | Symbol 6 | 1 | (0, 0) | (100, 100) |

FIG.31

| Use Count In Tokyo | |
|---|---|
| Symbol Type | Use Count |
| Symbol 1 | 20 |
| Symbol 2 | 50 |
| Symbol 3 | 80 |
| Symbol 4 | 100 |
| Symbol 5 | 40 |
| Symbol 6 | 0 |
| Symbol 7 | 0 |
| Symbol 8 | 0 |
| Symbol 9 | 0 |
| Symbol 10 | 0 |
| ⋮ | ⋮ |
| Symbol 1000 | 0 |

| Use Count In Osaka | |
|---|---|
| Symbol Type | Use Count |
| Symbol 1 | 0 |
| Symbol 2 | 0 |
| Symbol 3 | 0 |
| Symbol 4 | 0 |
| Symbol 5 | 100 |
| Symbol 6 | 10 |
| Symbol 7 | 90 |
| Symbol 8 | 50 |
| Symbol 9 | 70 |
| Symbol 10 | 0 |
| ⋮ | ⋮ |
| Symbol 1000 | 0 |

FIG.32

Use Count In Tokyo

| Symbol Type | Use Count |
|---|---|
| Symbol 4 | 100 |
| Symbol 3 | 80 |
| Symbol 2 | 50 |
| Symbol 5 | 40 |
| Symbol 1 | 20 |
| Symbol 6 | 0 |
| Symbol 7 | 0 |
| Symbol 8 | 0 |
| Symbol 9 | 0 |
| Symbol 10 | 0 |
| ⋮ | ⋮ |
| Symbol 1000 | 0 |

Use Count In Osaka

| Symbol Type | Use Count |
|---|---|
| Symbol 5 | 100 |
| Symbol 7 | 90 |
| Symbol 9 | 70 |
| Symbol 8 | 50 |
| Symbol 6 | 10 |
| Symbol 1 | 0 |
| Symbol 2 | 0 |
| Symbol 3 | 0 |
| Symbol 4 | 0 |
| Symbol 10 | 0 |
| ⋮ | ⋮ |
| Symbol 1000 | 0 |

FIG.33

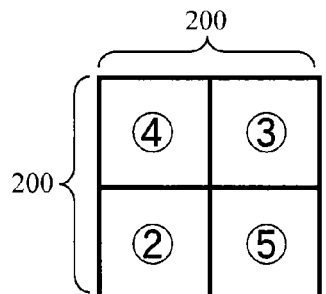

Texture Atlas 0

FIG.34

| Cache Number | Symbol Type | Texture Index | Upper Left Coordinates | Lower Right Coordinates |
|---|---|---|---|---|
| 0 | Symbol 4 | 0 | (0, 0) | (100, 100) |
| 1 | Symbol 3 | 0 | (100, 0) | (200, 100) |
| 2 | Symbol 2 | 0 | (0, 100) | (100, 200) |
| 3 | Symbol 5 | 0 | (100, 100) | (200, 200) |

Texture Atlas 0       Texture Atlas 1

| Cache Number | Symbol Type | Texture Index | Upper Left Coordinates | Lower Right Coordinates |
|---|---|---|---|---|
| 0 | Symbol 4 | 0 | (0, 0) | (100, 100) |
| 1 | Symbol 2 | 0 | (100, 0) | (200, 100) |
| 2 | Symbol 6 | 0 | (0, 100) | (100, 200) |
| 3 | Symbol 5 | 0 | (100, 100) | (200, 200) |
| 4 | Symbol 5 | 1 | (0, 0) | (100, 100) |
| 5 | Symbol 7 | 1 | (100, 0) | (200, 100) |
| 6 | Symbol 9 | 1 | (0, 100) | (100, 200) |
| 7 | Symbol 8 | 1 | (100, 100) | (200, 200) |

MAP SYMBOL DRAWING DEVICE

FIELD OF THE INVENTION

The present invention relates to a map symbol drawing device that draws symbols in a map at a high speed.

BACKGROUND OF THE INVENTION

A two-dimensional map display device which is represented by a car navigation device displays a bitmapped image called a symbol as each indication icon (e.g., an icon showing a convenience store, a bank, a gas station, or the like). While these symbols are usually drawn by using a two-dimensional drawing core, a method of drawing a two-dimensional symbol using a three-dimensional drawing core has been developed following recent developments in such a three-dimensional drawing core.

Symbol drawing using a three-dimensional drawing core uses a 3D graphics technology. Therefore, when aiming at an improvement in the speed of drawing, a high-speed drawing method for use in a typical 3D graphics technology is effective. There is a method called texture atlas as one of speeding up techniques. In three-dimensional drawing, a two-dimensional image called a texture is mapped onto a polyhedron called a polygon which consists of a plurality of vertices, so that various expressions, such as buildings for use in a racing game and characters for use in an action game, can be achieved.

However, when mapping a different texture onto each polygon, switching the texture to be used between textures is required, but the process of switching between textures is generally carried out at a low speed. Therefore, a map symbol drawing device that reduces the number of times that a texture switching process is carried out at a time of drawing by incorporating a plurality of textures into a single large texture (texture atlas) in advance in order to provide an improvement in the speed of drawing is disclosed by the following patent reference 1. More specifically, the map symbol drawing device disclosed by the patent reference 1 generates a texture atlas for each part in a three-dimensional model, such as a character, thereby preventing the process of switching between textures from being carried out at the time of drawing each part.

RELATED ART DOCUMENT

Patent Reference

Patent reference 1: Japanese Unexamined Patent Application Publication No. 2009-45091 (for example, paragraph numbers [0012] and [0013])

SUMMARY OF THE INVENTION

Because the conventional map symbol drawing device is constructed as above, the conventional map symbol drawing device combines textures for each part of a model to be drawn simultaneously to generate a texture atlas. Therefore, a problem is that a number of texture atlases corresponding to the number of parts of the model are required, and the memory area to be used becomes large. A further problem is that particularly in a map display device of embedded type which is represented by a car navigation device, it is difficult to generate all necessary texture atlases because a strong constraint is placed on the memory size.

The present invention is made in order to solve the above-mentioned problems, and it is therefore an object of the present invention to provide a map symbol drawing device that can draw symbols in a map at a high speed even if no large memory area is installed in the map symbol drawing device.

In accordance with the present invention, there is provided a map symbol drawing device including: a texture generating unit for generating one or more textures within limits of a maximum size in a memory which can be used as textures; a number-of-references counting unit for counting the number of references per symbol type to symbols existing in a map; a symbol image writing unit for acquiring images of a number of symbols having a larger number of references per symbol type which is counted by the number-of-references counting unit from among the symbols existing in the map to write the image of each of the number of symbols having a larger number of references in a texture generated by the texture generating unit; a symbol information storage unit for storing symbol information showing a type and a write position of each of the symbols whose images are written in the texture by the symbol image writing unit; a polygon generating unit for generating vertices of a 3D polygon according to display coordinates of a symbol to be drawn; a write checking unit for referring to the symbol information stored in the symbol information storage unit to check to see whether or not an image of a symbol of the same type as the symbol to be drawn is written in the texture; a texture coordinate setting unit for, when the write checking unit determines that an image of a symbol of same type as the symbol to be drawn is written in the texture, setting the write position of the above-mentioned symbol in the above-mentioned texture to the vertices of the 3D polygon generated by the polygon generating unit as texture coordinates, otherwise generating an original texture in which the image of the symbol to be drawn is drawn and setting coordinates of the texture to the vertices of the 3D polygon generated by the polygon generating unit; and a polygon drawing unit for drawing the 3D polygon in which the texture coordinates are set by the texture coordinate setting unit.

Because the map symbol drawing device accordance with the present invention is constructed in such a way that the map symbol drawing device includes: the texture generating unit for generating one or more textures within limits of a maximum size in the memory which can be used as textures; the number-of-references counting unit for counting the number of references per symbol type to symbols existing in a map; the symbol image writing unit for acquiring the images of a number of symbols having a larger number of references per symbol type which is counted by the number-of-references counting unit from among the symbols existing in the map to write the image of each of the number of symbols having a larger number of references in a texture generated by the texture generating unit; the symbol information storage unit for storing the symbol information showing the type and the write position of each of the symbols whose images are written in the texture by the symbol image writing unit; the polygon generating unit for generating the vertices of a 3D polygon according to the display coordinates of a symbol to be drawn; the write checking unit for referring to the symbol information stored in the symbol information storage unit to check to see whether or not the image of a symbol of the same type as the symbol to be drawn is written in the texture; and the texture coordinate setting unit for, when the write checking unit determines that the image of a symbol of the same type as the symbol to be drawn is written in the texture, setting the write position of the above-mentioned symbol in the above-mentioned texture to the vertices of the 3D polygon generated by the polygon generating unit as texture coordinates, otherwise generating an original texture in which the image of the symbol to be drawn is drawn and setting the coordinates of the texture to the vertices of the 3D polygon generated by the polygon generating unit, and the polygon drawing unit draws the 3D polygon in which the texture coordinates are set by the texture coordinate setting unit. Therefore, there is provided an advantage of being able to draw symbols in a map at a high speed even when no large memory area is installed in the map symbol drawing device.

BRIEF DESCRIPTION OF THE FIGURES

FIG. 9 is an explanatory drawing showing an example of symbol information;

FIG. 10 is an explanatory drawing showing a state in which top four symbols 4, 2, 6, and 5 are written in a texture atlas 0;

FIG. 11 is an explanatory drawing showing symbol information about the top four symbols 4, 2, 6, and 5 stored in a symbol information cache 21;

FIG. 12 is an explanatory drawing showing a state in which top eight symbols 4, 2, 6, 5, 8, 7, 1, and 9 are written in texture atlases 0 and 1;

FIG. 23 is an explanatory drawing showing an example of the number of references (use count) per symbol type to symbols existing in each scale-specific map;

FIG. 31 is an explanatory drawing showing an example of the number of references (use count) per symbol type to symbols existing in each area-specific map;

FIG. 32 is an explanatory drawing showing a sorted result acquired by a type-based sorting unit 73;

FIG. 33 is an explanatory drawing showing a texture atlas in a case in which a target area is Tokyo;

FIG. 34 is an explanatory drawing showing symbol information about top four symbols 4, 3, 2, and 5 stored in a symbol information cache 21;

EMBODIMENTS OF THE INVENTION

Hereafter, in order to explain this invention in greater detail, the preferred embodiments of the present invention will be described with reference to the accompanying drawings.

Embodiment 1

Figure 1:
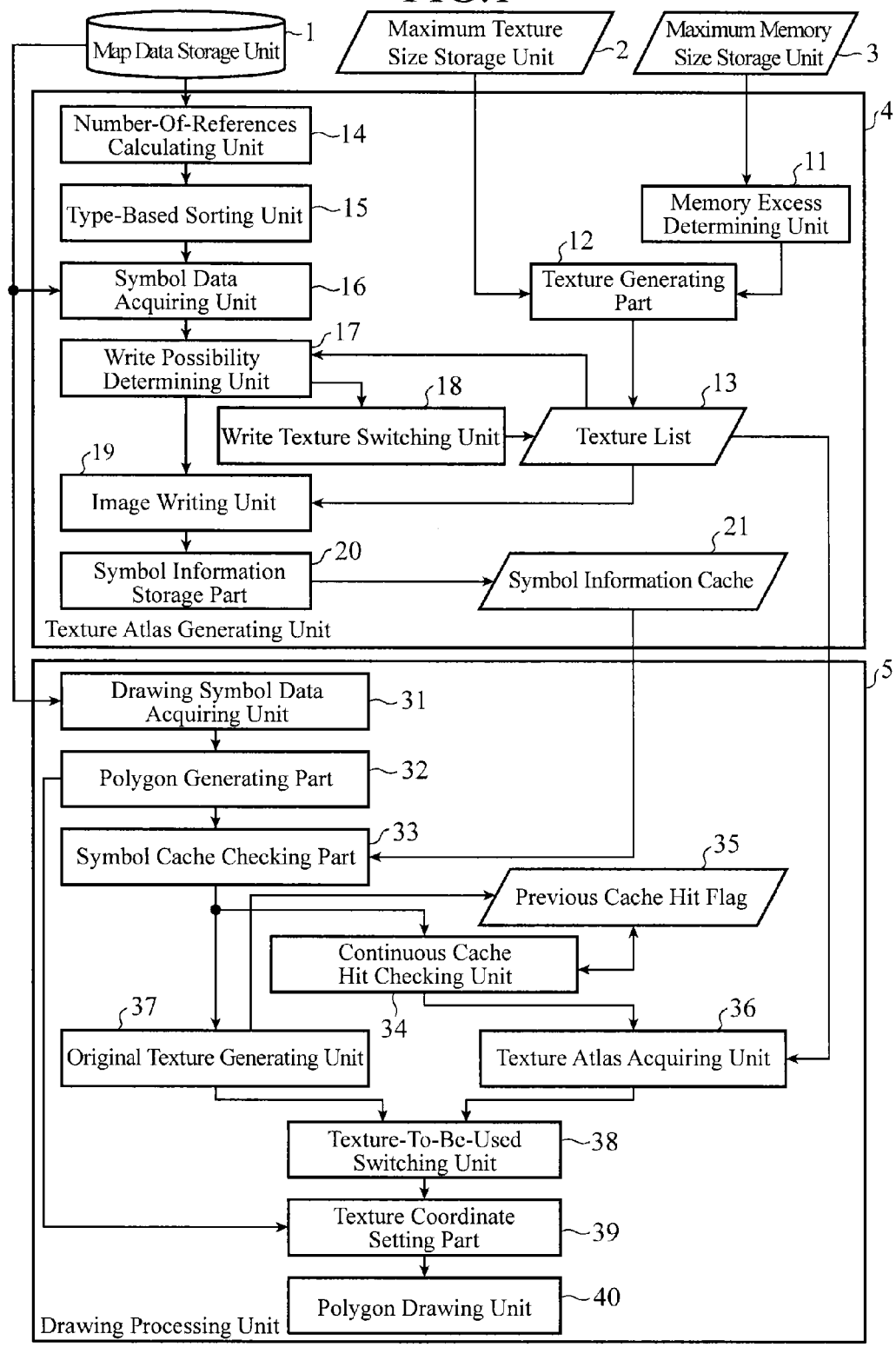
FIG. 1 is a block diagram showing a map symbol drawing device in accordance with Embodiment 1 of the present invention.

FIG. 1 is a block diagram showing a map symbol drawing device in accordance with Embodiment 1 of the present invention. Referring to FIG. 1, a map data storage unit 1 is a hard disk or the like for storing map data (including information about symbols in a map as well as information about roads in the map and so on) which are pieces of information of the map which are to be displayed on a map display unit such as a car navigation device. A maximum texture size storage unit 2 is a recording medium, such as a RAM, for storing a maximum size (maximum texture size) of each texture which can be ensured by the map display unit such as a car navigation device. A maximum memory size storage unit 3 is a recording medium, such as a RAM, for storing a memory size (maximum memory size) available as textures. The memory size available as textures is a value which can be determined by a user.

A texture atlas generating unit 4 is a processing unit which consists of, for example, a semiconductor circuit in which a CPU or the like is mounted or a one chip microcomputer, and which carries out a process of writing an image of a symbol in a texture, a process of storing symbol information showing the type and the write position of the symbol, and so on when the map symbol drawing device is started. A drawing processing unit 5 is a processing unit which consists of, for example, a semiconductor circuit or a GPU (Graphics Processing Unit) in which a CPU or the like is mounted or a one chip microcomputer, and which carries out a process of setting the write position of each symbol in a texture to the vertices of a 3D polygon as texture coordinates when updating the drawing of the map, a process of drawing the 3D polygon in which the texture coordinates are set as the vertices thereof, and so on.

A memory excess determining unit 11 of the texture atlas generating unit 4 carries out a process of comparing the size of all textures which are already generated for the memory available as textures with the maximum memory size stored in the maximum memory size storage unit 3 to determine whether or not it is possible to newly generate a texture. A texture generating part 12 carries out a process of repeatedly generating a texture (a texture having the maximum texture size stored in the maximum texture size storage unit 2) until the memory excess determining unit 11 determines that it is impossible to newly generate a texture anymore. More specifically, the texture generating unit carries out a process of generating a texture as many times as possible within the limits of the maximum size of the memory available as textures. The texture generating part 12 also carries out a process of adding information about each generated texture to a texture list 13. A texture generating unit is comprised of the memory excess determining unit 11 and the texture generating part 12.

A number-of-references calculating unit 14 carries out a process of referring to the map data stored in the map data storage unit 1 to count the number of references per symbol type to the symbols existing in the map. A type-based sorting unit 15 carries out a process of sorting the types of the symbols in descending order of the number of references counted by the number-of-references calculating unit 14. A number-of-references counting unit is comprised of the number-of-references calculating unit 14 and the type-based sorting unit 15. A symbol data acquiring unit 16 carries out a process of acquiring symbol data about each type of symbols (data showing the type, the image, the size of each type of symbols) from the map data storage unit 1 in descending order starting from the symbol type having the largest number of references which is determined by the type-based sorting unit 15.

A write possibility determining unit 17 carries out a process of determining whether or not it is possible to write the image of each symbol acquired by the symbol data acquiring unit 16 in a texture generated by the texture generating part 12. A write texture switching unit 18 carries out a process of, when the write possibility determining unit 17 determines that it is impossible to write the image of each symbol acquired by the symbol data acquiring unit (in a state in which a predetermined number of images of symbols are already written in the current texture), referring to the texture list 13 to switch the target texture for image writing from the current texture to another texture.

An image writing unit 19 carries out a process of writing the image of each symbol which is acquired by the symbol data acquiring unit 16 in either the texture in which the write possibility determining unit 17 determines the image of each symbol can be written or another texture to which the current texture is switched by the write texture switching unit 18. A symbol image writing unit is comprised of the symbol data acquiring unit 16, the write possibility determining unit 17, the write texture switching unit 18, and the image writing unit 19.

A symbol information storage part 20 carries out a process of storing the symbol information showing the type and the write position of each symbol whose image is written in the texture by the image writing unit 19 in a symbol information cache 21. The symbol information cache 21 is a storage medium, such as a RAM, for storing symbol information. A symbol information storage unit is comprised of the symbol information storage part 20 and the symbol information cache 21.

A drawing symbol data acquiring unit 31 of the drawing processing unit 5 carries out a process of acquiring the symbol data about the symbols in the map to be displayed on the map display unit (the symbols to be drawn) from the map data storage unit 1 one by one. A polygon generating part 32 carries out a process of generating the vertices of a 3D polygon according to the symbol size and the symbol position (display coordinates) shown by each symbol data acquired by the drawing symbol data acquiring unit 31. A polygon generating unit is comprised of the drawing symbol data acquiring unit 31 and the polygon generating part 32.

A symbol cache checking unit 33 carries out a process of referring to the symbol information stored in the symbol information cache 21 to check to see whether or not an image of the same type as each symbol to be drawn is written in the texture. A continuous cache hit checking unit 34 carries out a process of, when the symbol cache checking unit 33 determines that an image of the same type of a symbol to be drawn is written in the texture, checking to see whether a previous cache hit flag 35 showing the result of a check of a previous cache hit is "TRUE" or "FALSE." A write checking unit is comprised of the symbol cache checking unit 33, the continuous cache hit checking unit 34, and the previous cache hit flag 35.

A texture atlas acquiring unit 36 carries out a process of referring to the texture list 13 to acquire a texture which is to be used at the time of polygon drawing when the continuous cache hit checking unit 34 determines that the previous cache hit flag 35 is "FALSE." An original texture generating unit 37 carries out a process of, when the symbol cache confirming unit 33 does not determine that an image of the same type as a symbol to be drawn is written in the texture, generating an original texture in which the image of the symbol to be drawn is drawn by using the symbol data acquired by the drawing symbol data acquiring unit 31.

When a texture is acquired by the texture atlas acquiring unit 36, a texture-to-be-used switching unit 38 performs a setup to switch the texture to be used at the time of polygon drawing from the current texture to the texture acquired by the texture atlas acquiring unit, while when a texture is generated by the original texture generating unit 37, the texture-to-be-used switching unit 38 performs a setup to switch the texture to be used at the time of polygon drawing from the current texture to the texture generated by the original texture generating unit. A texture coordinate setting part 39 carries out a process of setting the write position of each symbol in the texture which is set by the texture-to-be-used switching unit 38 to the vertices of a 3D polygon generated by the polygon generating unit 32 as texture coordinates. A texture coordinate setting unit is comprised of the texture atlas acquiring unit 36, the original texture generating unit 37, the texture-to-be-used switching unit 38, and the texture coordinate setting part 39.

A polygon drawing part 40 carries out a process of drawing the 3D polygon in which the texture coordinates are set by the texture coordinate setting unit 39. The polygon drawing part 40 constructs a polygon drawing unit.

Figure 2:
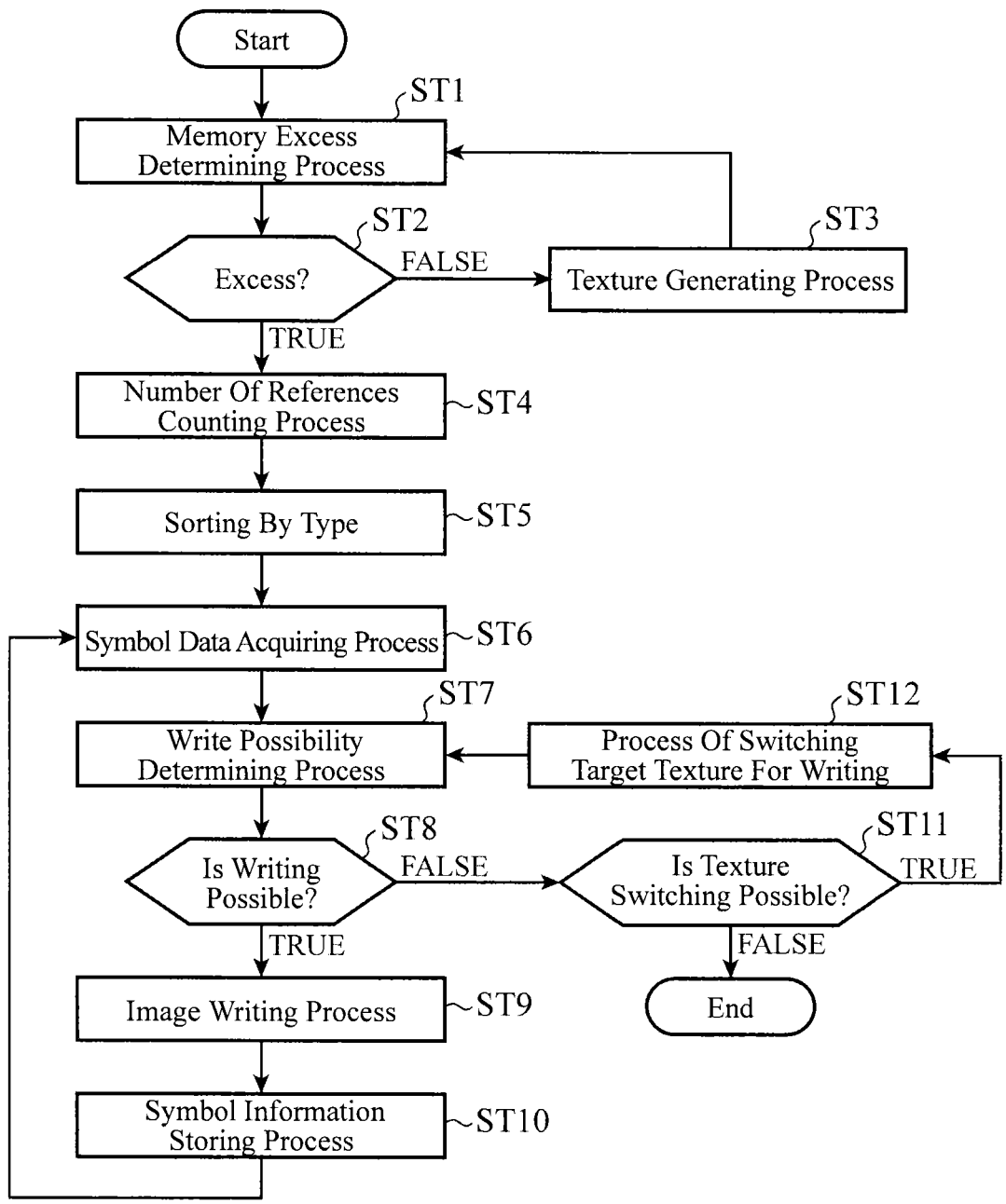
FIG. 2 is a flow chart showing processing carried out by a texture atlas generating unit 4 of the map symbol drawing device in accordance with Embodiment 1 of the present invention.
Figure 3:
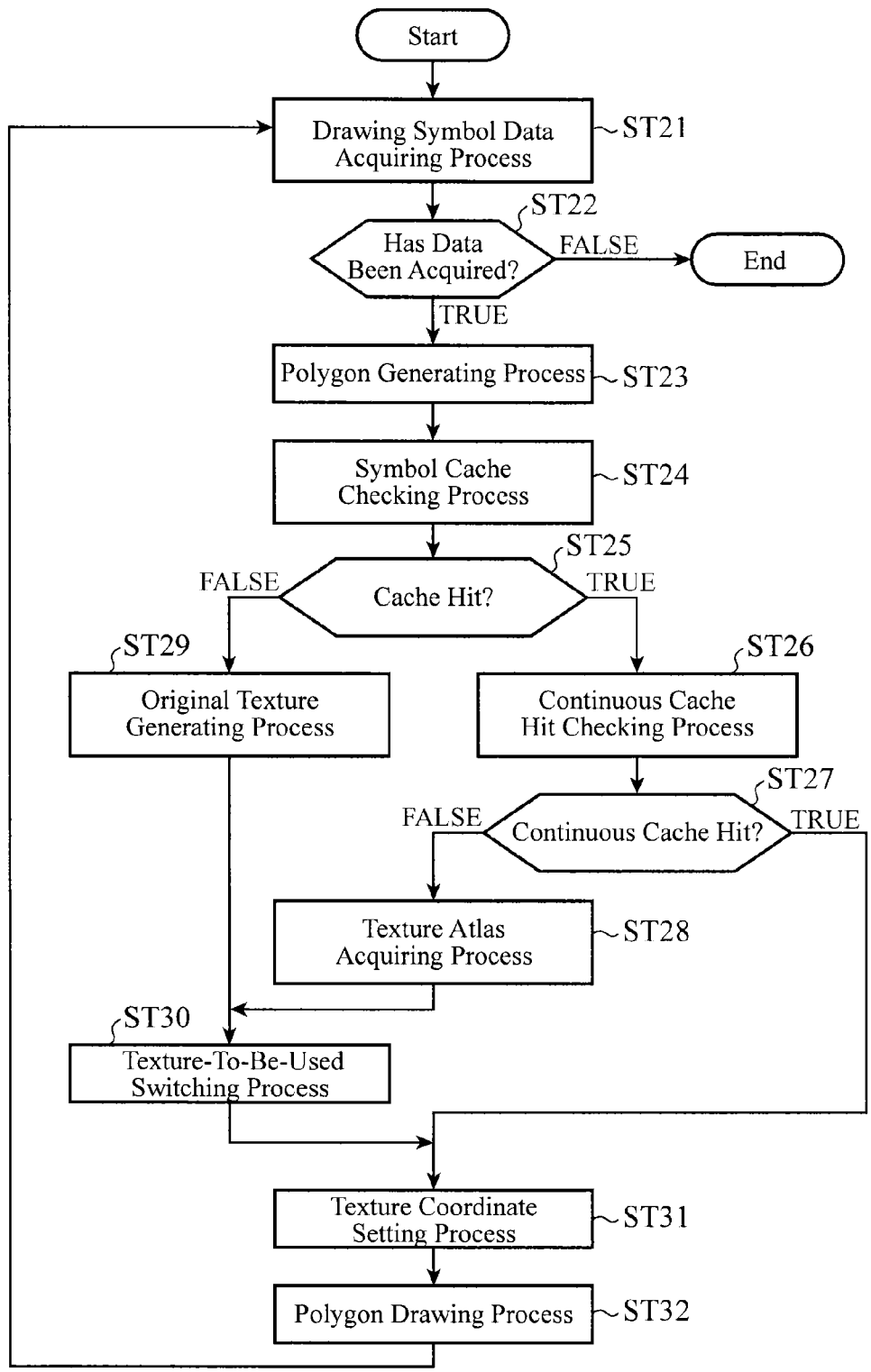
FIG. 3 is a flow chart showing processing carried out by a drawing processing unit 5 of the map symbol drawing device in accordance with Embodiment 1 of the present invention.

In the example shown in FIG. 1, the memory excess determining unit 11, the texture generating part 12, the number-of-references calculating unit 14, the type-based sorting unit 15, the symbol data acquiring unit 16, the write possibility determining unit 17, the write texture switching unit 18, the image writing unit 19, the symbol information storage part 20, the drawing symbol data acquiring unit 31, the polygon generating part 32, the symbol cache confirming part 33, the continuous cache hit checking unit 34, the texture atlas acquiring unit 36, the original texture generating unit 37, the texture-to-be-used switching unit 38, the texture coordinate setting part 39, and the polygon drawing part 40, which are the components of the map symbol drawing device, can consist of pieces of hardware for exclusive use (e.g., semiconductor integrated circuits in each of which a CPU is mounted, one chip microcomputers, or the like), respectively. As an alternative, the map symbol drawing device can consist of a computer, and a program in which the processes carried out by the memory excess determining unit 11, the texture generating part 12, the number-of-references calculating unit 14, the type-based sorting unit 15, the symbol data acquiring unit 16, the write possibility determining unit 17, the write texture switching unit 18, the image writing unit 19, the symbol information storage part 20, the drawing symbol data acquiring unit 31, the polygon generating part 32, the symbol cache checking part 33, the continuous cache hit checking unit 34, the texture atlas acquiring unit 36, the original texture generating unit 37, the texture-to-be-used switching unit 38, the texture coordinate setting part 39, and the polygon drawing unit 40 are described can be stored in a memory of the computer and the CPU of the computer can be made to execute the program stored in the memory. FIG. 2 is a flow chart showing the processing carried out by the texture atlas generating unit 4 of the map symbol drawing device in accordance with Embodiment 1 of the present invention. Further, FIG. 3 is a flow chart showing the processing carried out by the drawing processing unit 5 of the map symbol drawing device in accordance with Embodiment 1 of the present invention.

Figures 4, 5:
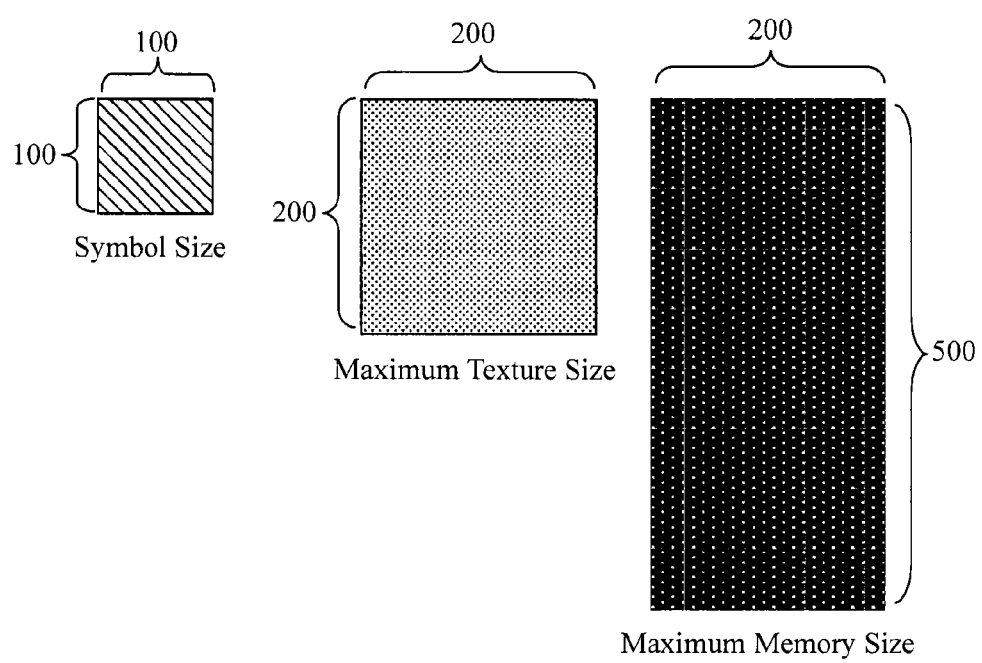
FIG. 4 is an explanatory drawing showing an example of the number of references (use count) per symbol type to symbols existing in a map.
FIG. 5 is an explanatory drawing showing an example of a symbol size, a maximum texture size, and a maximum memory size.

Next, the operation of the map symbol drawing device will be explained. In this Embodiment 1, for the sake of simplicity, it is assumed that the map display unit has a map display screen size of 1,000×1,000 and the map data include 1,000 types of symbols. FIG. 4 is an explanatory drawing showing an example of the number of references (use count) per symbol type to symbols existing in a map. Further, in this Embodiment 1, it is assumed that the size of each symbol is 100×100 [pixel], the maximum texture size is 200×200 [pixel], and the maximum memory size is 200×500 [pixel] (refer to the FIG. 5).

Figures 6, 7, 8:
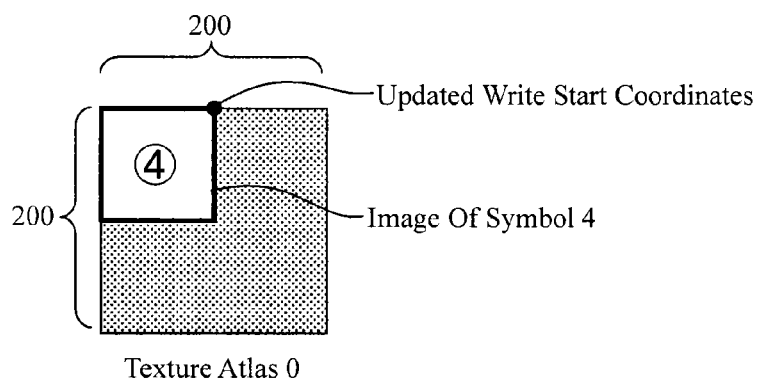
FIG. 6 is an explanatory drawing showing an example of drawing symbol data.
FIG. 7 is an explanatory drawing showing a sorted result acquired by a type-based sorting unit 15.
FIG. 8 is an explanatory drawing showing a state in which an image of a symbol 4 is written in a texture.

It is also assumed that when the map symbol drawing device is started, the used memory size is "0", the texture list 13 is empty, a write texture index is "0", and write start coordinates are (0, 0). It is further assumed that the drawing symbol data are a set of six pairs of window coordinates and symbol types as shown in FIG. 6, and the previous cache hit flag 35 is "FALSE." In this case, a coordinate system for textures and a display window coordinate system are defined with their upper left corners being set as a point of origin, and their X axial directions are oriented to the right and their Y axis directions are oriented to the lower.

First, the processing carried out by the texture atlas generating unit 4 will be explained. The memory excess determining unit 11 of the texture atlas generating unit 4 compares the total size $\text{Tsize}_{NOW}$ of one or more textures which are already generated for the memory available as textures with the maximum memory size $M_{MAX}$ stored in the maximum memory size storage unit 3 to determine whether or not it is possible to newly generate a texture. More specifically, when the addition of the maximum size $\text{Tsize}_{MAX}$ of a texture which is to be newly generated (the maximum texture size stored in the maximum texture size storage unit 2) to the total size $\text{Tsize}_{NOW}$ of one or more textures which are already generated results in an excess from the maximum memory size $\text{MEM}_{MAX}$, as shown in the following equation (1), the memory excess determining unit 11 determines with it is impossible to newly generate a texture because the addition result exceeds the maximum memory size (steps ST1 and ST2 of FIG. 2). In contrast, when the addition result does not exceed the maximum memory size $\text{MEM}_{MAX}$, the memory excess determining unit determines that it is possible to newly generate a texture (steps ST1 and ST2 of FIG. 2).

$$\text{Tsize}_{NOW}+\text{Tsize}_{MAX}>\text{MEM}_{MAX} \qquad (1)$$

Because the total size $\text{Tsize}_{NOW}$ (used memory size) of one or more textures which are already generated at a time when the map symbol drawing device is started is "0", $\text{Tsize}_{NOW}+\text{Tsize}_{MAX}$ is "200×200" and hence does not exceed the maximum memory size of "200×500", the memory excess determining unit determines that it is possible to newly generate a texture.

After the memory excess determining unit 11 determines that it is possible to newly generate a texture, the texture generating part 12 generates a texture having the maximum texture size of $\text{Tsize}_{MAX}$ (texture having a size of 200×200) (step ST3). The texture generating part 12 also adds information about the texture generated thereby to the texture list 13. After the texture generating part 12 newly generates a texture, the texture atlas generating unit adds the maximum texture size $\text{Tsize}_{MAX}$ to the used memory size and then returns to the memory excess determining process of step ST1 again. When the maximum texture size is 200×200 [pixel] and the maximum memory size is 200×500 [pixel], as mentioned above, two textures each having a size of 200×200 can be generated, but an excess in the memory is expected when a third texture is generated. Therefore, the texture generating part does not generate any more texture after generating two textures, and then shifts to a process of step ST4.

The number-of-references calculating unit 14 counts the number of references per symbol type to the symbols existing in the map by referring to the map data stored in the map data storage unit 1 (step ST4). For example, the number-of-references calculating unit can implement the process of extracting the symbol data about each of all the symbols existing in the map from the map data storage unit 1 and counting the number of references per symbol type to the symbols existing in the map. In this Embodiment 1, it is assumed that the number of references (use count) per symbol type as shown in FIG. 4 is acquired for each of 1,000 symbols.

After the number-of-references calculating unit 14 counts the number of references per symbol type to the symbols, the type-based sorting unit 15 sorts the types of the symbols in descending order of the counted number of references, as shown in FIG. 7 (step ST5). In the example of FIG. 7, the numbers of references per symbol type to the symbols showing the counted results acquired by the number-of-references calculating unit 14 are sorted in descending order (for example, sorted according to a merge sort algorithm), and the symbols are aligned in order of the symbol 4, the symbol 2, the symbol 6, the symbol 5, . . . .

The symbol data acquiring unit 16 acquires the symbol data about each type of symbols (data showing the type, the image, the size of each type of symbols) from the map data storage unit 1 in descending order starting from the symbol type having the largest number of references which is determined by the type-based sorting unit 15 (step ST6). In the example shown in FIG. 7, the symbol data acquiring unit acquires the symbol data about the symbol 4 first.

Every time when the symbol data acquiring unit 16 acquires symbol data, the write possibility determining unit 17 determines whether or not it is possible to write the image of the symbol shown by the symbol data in a texture generated by the texture generating part 12 (the texture in the texture list 13 which is indicated by the write texture index) (step ST7). The write possibility determining unit determines whether or not it is possible to write the image of the symbol shown by the symbol data in the texture according to the following equation (2).

$$(SX+SymW \leq TexW) \&\& (SY+SymH \leq TexH) \quad (2)$$

where SX is the X coordinate of the write start coordinates, SY is the Y coordinate of the write start coordinates, SymW is the vertical size of the symbol whose image is written in the texture, SymH is the horizontal size of the symbol whose image is written in the texture, TexW is the vertical size of the texture in which the image of the symbol is written, and TexH is the horizontal size of the texture in which the image of the symbol is written.

Because the write texture index is "0" at the time that the symbol data about the symbol 4 is acquired, the texture in which this symbol data is to be written is a texture atlas 0 (texture generated the first time around), and the above-mentioned equation (2) becomes (0+100≤200)&&(0+100≤200). Therefore, the result of the determination done by the write possibility determining unit is "TRUE" (the write possibility determining unit determines that it is possible to write the image of the symbol in the texture).

When the write possibility determining unit determines that it is possible to write the image of the symbol in the texture, the image writing unit 19 carries out the process of writing the image of the symbol acquired by the symbol data acquiring unit 16 in the texture in the texture list 13 which is indicated by the write texture index (writing the image of the symbol in the texture while setting the upper left point of the texture as the write start coordinates) (step ST9). After writing the image of the symbol in the texture, the image writing unit 19 updates the write start coordinates. At this time, when the following equation (3) is established, the image writing unit updates the write start coordinates to (SX+SymW, SY), otherwise updates the write start coordinates to (0, SY+SymH).

$$(SX+2 \times SymW \leq TexW) \quad (3)$$

Because the equation (3) is established at the time that the symbol data about the symbol 4 is acquired, the write start coordinates are updated to (100, 0) and the texture is placed in such a state as shown in FIG. 8.

After the image writing unit 19 writes the image of the symbol in the texture, the symbol information storage part 20 stores the symbol information showing the type and the write position of the symbol in the symbol information cache 21 (step ST10). The symbol information includes the index identifying the texture in which the image has been written, in addition the type and the write position of the symbol (the upper left coordinates and the lower right coordinates of the symbol), as shown in FIG. 9. In the example shown in FIG. 9, symbol 4, 0, (0, 0), and (100, 100) are stored as the symbol information.

After the symbol information storage part 20 stores the symbol information in the symbol information cache 21, the symbol data acquiring unit 16 acquires the symbol data about the next symbol from the map data storage unit 1 (step ST6). In the example shown in FIG. 7, the symbol data about the symbol 2 is acquired. Also when the symbol data about the symbol 2 is acquired, the texture atlas generating unit carries out the processes of steps ST6 to ST10, like in the case in which the symbol data about the symbol 4 is acquired.

Because the result of the determination according to the equation (2) is "TRUE" for each of the top first through fourth symbols having a larger number of references in the symbols which are sorted in descending order by the type-based sorting unit 15, the top four symbols are written in the texture atlas 0. FIG. 10 is an explanatory drawing showing a state in which the top four symbols 4, 2, 6, and 5 are written in the texture atlas 0. FIG. 11 is an explanatory drawing showing the pieces of symbol information about the top four symbols 4, 2, 6, and 5 which are stored in the symbol information cache 21. At the time that the four symbols 4, 2, 6, and 5 are written in the texture atlas 0, the write start coordinates are set to (0, 200).

Because the result of the determination according to the equation (2) is "FALSE" at the time that the symbol 8 which is the fifth one of the symbols sorted by the type-based sorting unit 15 is acquired, the texture atlas generating unit shifts to a process of step ST11. After the top four symbols 4, 2, 6, and 5 are written in the texture atlas 0 and the result of the determination according to the equation (2) becomes "FALSE", the write texture switching unit 18 adds "1" to the write texture index. The write texture switching unit 18 then refers to the texture list 13 to check to see whether the texture having the write texture index of "1" which is the addition result exists.

When the texture having the write texture index of "1" exists, the write texture switching unit 18 determines that it is possible to switch the target texture for image writing to this texture having the write texture index of "1", otherwise determines that it is impossible to switch the target texture for image writing to another texture and ends the texture atlas generating process (step ST11). In this Embodiment 1, because the texture generating part 12 generates the two textures (the texture having the write texture index of "0" and the texture having the write texture index of "1"), the write texture switching unit determines that it is possible to switch the target texture for image writing to another texture at this time. When determining that it is possible to switch the target texture for image writing to another texture, the write texture switching unit 18 carries out a process of switching the target texture for image writing to the texture having the write texture index of "1" (step ST12). The write texture switching unit 18 also sets the write start coordinates to (0, 0).

Figures 13, 14:
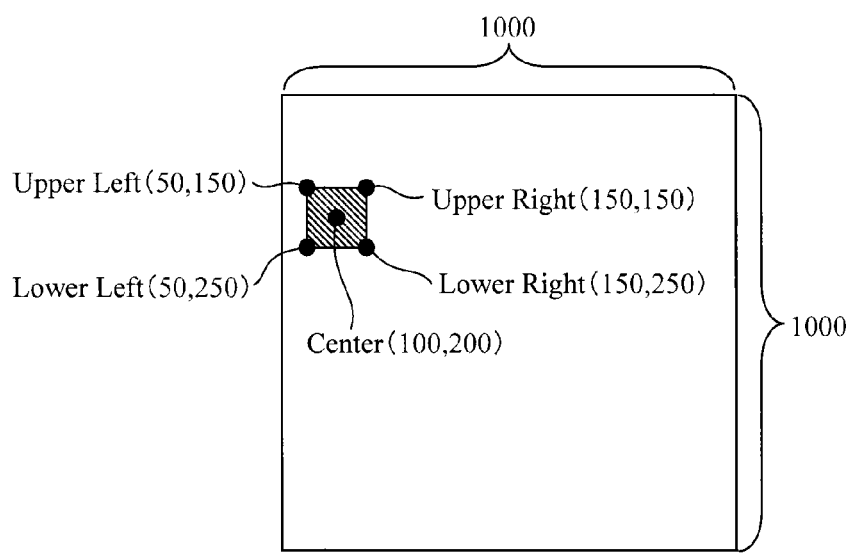
FIG. 13 is an explanatory drawing showing symbol information about the top eight symbols 4, 2, 6, 5, 8, 7, 1, and 9 stored in the symbol information cache 21.
FIG. 14 is an explanatory drawing showing the vertex coordinates of a polygon.

After that, because the result of the determination according to the equation (2) is "TRUE" for each of the top fifth through eighth symbols having a larger number of references in the symbols which are sorted in descending order by the type-based sorting unit 15, the processes of steps ST6 to ST10 are repeatedly carried out, and the top fifth through eighth symbols 8, 7, 1, and 9 are written in the texture atlas 1. FIG. 12 is an explanatory drawing showing a state in which the top eight symbols 4, 2, 6, 5, 8, 7, 1, and 9 are written in the texture atlases 0 and 1. FIG. 13 is an explanatory drawing showing the pieces of symbol information about the symbols 4, 2, 6, 5, 8, 7, 1, and 9 stored in the symbol information cache 21.

Because the result of the determination according to the equation (2) is "FALSE" at the time that the symbols 3 which is the ninth one of the symbols sorted by the type-based sorting unit 15 is acquired, the texture atlas generating unit shifts to the process of step ST11. After the top fifth through eighth symbols 8, 7, 1, and 9 are written in the texture atlas 1 and the result of the determination according to the equation (2) becomes "FALSE", the write texture switching unit 18 adds "1" to the write texture index. The write texture switching unit 18 then refers to the texture list 13 to check to see whether the texture having the write texture index of "2" which is the addition result exists. However, in this Embodiment 1, because the texture generating part 12 has generated only the two textures (the texture having the write texture index of "0" and the texture having the write texture index of "1"), but has not generated a texture having the write texture index of "2", the write texture switching unit determines that it is impossible to switch the target texture for image writing to another texture, and ends the texture atlas generating process (step ST11).

Next, the processing carried out by the drawing processing unit 5 will be explained. The drawing symbol data acquiring unit 31 of the drawing processing unit 5 acquires the symbol data about the symbols (symbols to be drawn) existing in the map to be displayed on the map display unit from the map data storage unit 1 one by one (step ST21 of FIG. 3). More specifically, the drawing symbol data acquiring unit 31 acquires the symbol data about each of the symbols in ascending order of a drawing data number. In this case, when there are no symbol data about symbols to be drawn, the drawing symbol data acquiring unit ends the drawing process (step ST22).

After the drawing symbol data acquiring unit 31 acquires symbol data, the polygon generating unit 32 generates the vertices of a 3D polygon according to the symbol size and the symbol position (display coordinates) shown by the symbol data (step ST23). The polygon generating process is the one of generating the four vertices in such a way that the polygon has the same size as the symbol size while being centered at the window coordinates of the symbol data. The coordinates of each vertex are set as a three-dimensional vector whose X and Y coordinates are the window coordinates and whose Z coordinate is 0. Because the window coordinates are (100, 200) when the symbol 4 having a drawing data number of "0" is acquired (refer to FIG. 6), the coordinates of the upper left vertex of the polygon are (50, 150, 0), the coordinates of the upper right vertex of the polygon are (150, 150, 0), the coordinates of the lower left vertex of the polygon are (50, 250, 0), and the coordinates of the lower right vertex of the polygon are (150, 250, 0), as shown in FIG. 14.

The symbol cache checking part 33 refers to the symbol information stored in the symbol information cache 21 to check to see whether or not the image of a symbol of the same type as the symbol to be drawn is written in a texture (step ST24). In this Embodiment 1, because the symbols 4, 2, 6, and 5 are written in the texture having the write texture index of "0" and the symbols 8, 7, 1, and 9 are written in the texture having the write texture index of "1", the symbol cache checking part determines that the image of a symbol of the same type as the symbol to be drawn is written in either of the textures when the symbol to be drawn is either one of the symbols 4, 2, 6, 5, 8, 7, 1, and 9. Because when the symbol 4 having a drawing data number of "0" is acquired, the symbol 4 is written in the texture having the write texture index of "0", the symbol cache checking part determines that the image of a symbol of the same type as the symbol to be drawn is written in a texture.

When the symbol cache checking part 33 determines that the image of a symbol of the same type as the symbol to be drawn is written in a texture (step ST25), the continuous cache hit checking unit 34 checks to see whether the previous cache hit flag 35 showing the previous cache hit check result is "TRUE" or "FALSE" (step ST26). Because the previous cache hit flag 35 is initialized to "FALSE" at a time when the map symbol drawing device is started, the continuous cache hit checking unit determines that the previous cache hit flag 35 is "FALSE" at this time and updates the previous cache hit flag 35 to "TRUE."

After the continuous cache hit checking unit 34 determines that the previous cache hit flag 35 is "FALSE" (step ST27), the texture atlas acquiring unit 36 refers to the texture list 13 to acquire a texture which is to be used at the time of polygon drawing (step ST28). More specifically, the texture atlas acquiring unit 36 acquires the texture specified by the texture index of the cache which is hit with the symbol type of the symbol data to be drawn. When the symbol 4 having a drawing data number of "0" is acquired, the texture atlas acquiring unit acquires the texture atlas 0 because the symbol 4 is written in the texture having the write texture index of "0."

In contrast, when the symbol cache checking part 33 does not determine that the image of a symbol of the same type as the symbol to be drawn is written in a texture (step ST25), the original texture generating unit 37 generates an original texture in which the image of the symbol to be drawn is drawn by using the symbol data acquired by the drawing symbol data acquiring unit 31 (step ST29). The original texture generating unit 37 also updates the previous cache hit flag 35 to "FALSE." The original texture has the same size as the symbol size (size of 100×100), and is the one in which the symbol image is drawn.

When the texture atlas acquiring unit 36 acquires a texture, the texture-to-be-used switching unit 38 performs a setup to switch the texture to be used at the time of polygon drawing to the acquired texture, whereas when the original texture generating unit 37 generates a texture, the texture-to-be-used switching unit 38 performs a setup to switch the texture to be used at the time of polygon drawing to the generated texture (step ST30). When the continuous cache hit checking unit 34 determines that the previous cache hit flag 35 is "TRUE" (step ST27), the texture-to-be-used switching unit does not carry out the texture switching process because the texture-to-be-used switching unit uses the same texture as the previous one as the texture to be used at the time of polygon drawing.

After the texture-to-be-used switching unit 38 carries out the process of switching the texture to be used at the time of polygon drawing to the acquired or generated texture, the texture coordinate setting unit 39 sets the write position of the symbol in the texture to the vertices of the polygon generated by the polygon generating unit 32 as the texture coordinates (step ST31). Hereafter, the processing carried out by the texture coordinate setting unit 39 will be explained concretely.

When the symbol cache checking part 33 determines that the image of a symbol of the same type of the symbol to be drawn is written in a texture (including not only when the continuous cache hit checking unit 34 determines that the previous cache hit flag 35 is "FALSE", but also when the continuous cache hit checking unit 34 determines that the previous cache hit flag is "TRUE"), the texture coordinate setting unit 39 substitutes the upper left coordinates and the lower right coordinates of the cache into the following equation (4) to calculate the texture coordinates.

The upper left texture coordinates=$(LTX/ATTexW, LTY/ATTexH)$

The upper right texture coordinates=$(RBX/ATTexW, LTY/ATTexH)$

The lower left texture coordinates=$(LTX/ATTexW, RBY/ATTexH)$

The lower right texture coordinates=$(RBX/ATTexW, RBY/ATTexH)$ (4)

where LTX is the X coordinate of the upper left point of the cache, LTY is the Y coordinate of the upper left point of the cache, RBX is the X coordinate of the upper right point of the cache, RTY is the Y coordinate of the upper right point of the cache, ATTexW is the horizontal size of the texture to be used, and ATTexH is the vertical size of the texture to be used.

When the symbol cache checking part 33 does not determine that the image of a symbol of the same type of the symbol to be drawn is written in a texture, the texture coordinate setting unit 39 calculates the texture coordinates according to the following equation (5).

The upper left texture coordinates=(0, 0)

The upper right texture coordinates=(1, 0)

The lower left texture coordinates=(0, 1)

The lower right texture coordinates=(1, 1)  (5)

Because the symbol cache checking part 33 determines that the image of a symbol of the same type of the symbol to be drawn is written in a texture when the symbol 4 having a drawing data number of "0" is acquired, the texture coordinate setting unit calculates the texture coordinates according to the equation (4), so that the upper left coordinates of the texture coordinates are (0, 0), the upper right coordinates of the texture coordinates are (0.5, 0), the lower left coordinates of the texture coordinates are (0, 0.5), and the lower right coordinates of the texture coordinates are (0.5, 0.5). After calculating the texture coordinates, the texture coordinate setting unit 39 sets the texture coordinates as the vertices of the 3D polygon generated by the polygon generating unit 32.

Figure 15:
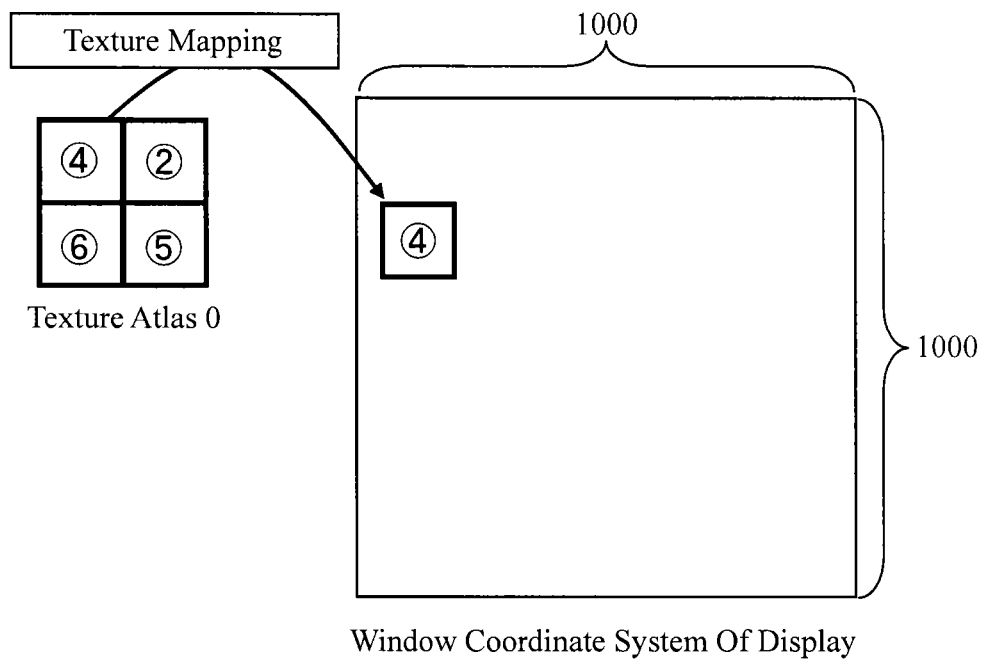
FIG. 15 is an explanatory drawing showing a drawing result acquired by a polygon drawing unit 40.

After the texture coordinate setting unit 39 sets the texture coordinates as the vertices of the 3D polygon, the polygon drawing unit 40 draws the 3D polygon by using the texture (step ST32). FIG. 15 is an explanatory drawing showing the result of the drawing carried out by the polygon drawing unit 40. After completing the polygon drawing process on the symbol 4 having a drawing data number of 0, the polygon drawing unit shifts to the polygon drawing process on the symbol 6 having a drawing data number of 1.

The polygon drawing unit carries out the polygon drawing process on the symbol 6 having a drawing data number of 1 in the same way that the polygon drawing unit carries out the polygon drawing process on the symbol 4 having a drawing data number of 0, so that the coordinates of the upper left vertex of the polygon are (350, 250, 0), the coordinates of the upper right vertex of the polygon are (450, 250, 0), the coordinates of the lower left vertex of the polygon are (350, 350, 0), and the coordinates of the lower right vertex of the polygon are (450, 350, 0). The symbol cache checking part 33 determines that the image of a symbol of the same type as the symbol to be drawn is written in a texture, and the result of the check of a symbol cache hit shows a cache hit. The continuous cache hit checking unit 34 then checks to see whether or not a continuous cache hit is detected. Because the previous cache hit flag 35 is "TRUE" at this time, the same texture as the previous one is used, so that the upper left coordinates of the texture coordinates set by the texture coordinate setting unit 39 are (0, 0.5), the upper right coordinates of the texture coordinates are (0.5, 0.5), the lower left coordinates of the texture coordinates are (0, 1), and the lower right coordinates of the texture coordinates are (0.5, 1).

Figure 16:
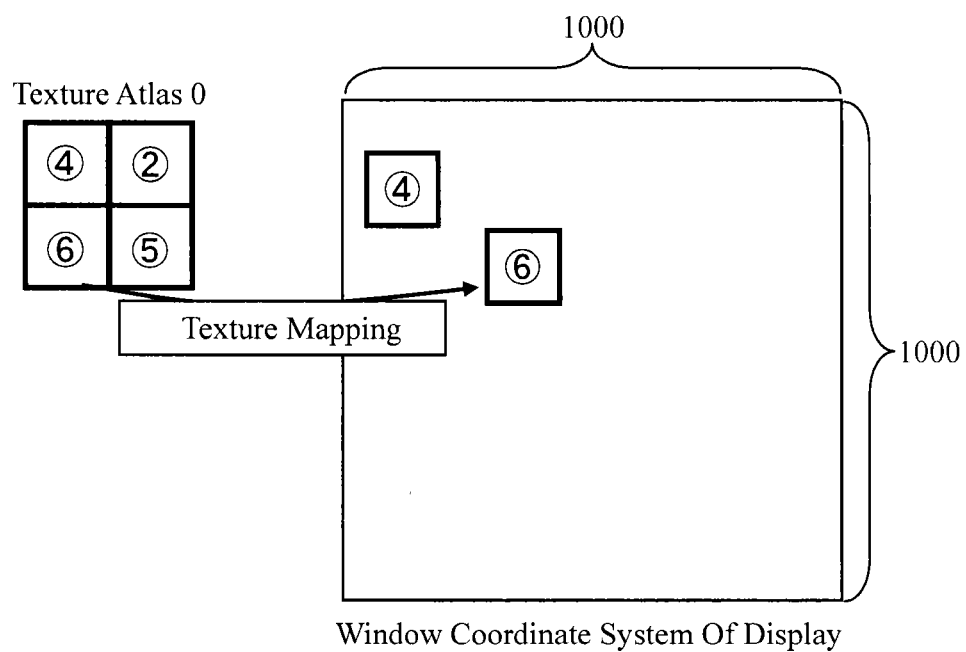
FIG. 16 is an explanatory drawing showing a drawing result acquired by the polygon drawing unit 40.
Figure 17:
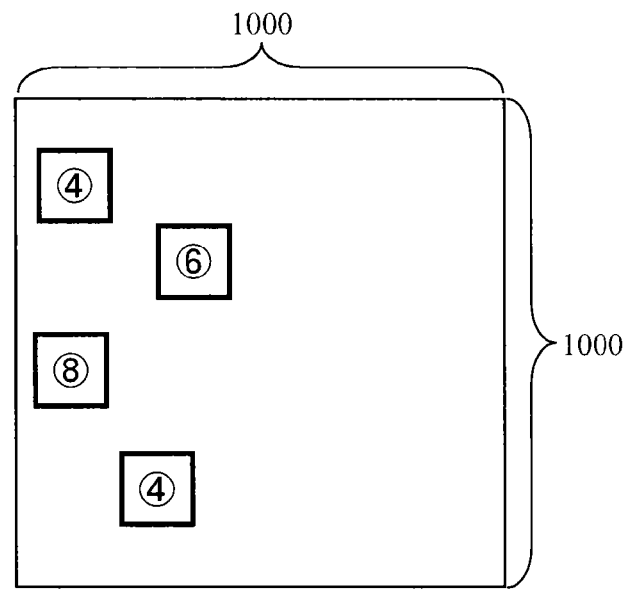
FIG. 17 is an explanatory drawing showing a drawing result acquired by the polygon drawing unit 40.

After that, the polygon drawing unit 40 carries out polygon drawing by using both the polygon generated by the polygon generating unit 32 and the texture to be used. At this time, the texture atlas 0 is used as the texture to be used, just as it is, because no switching process is performed on the texture to be used selected for the drawing data number of "0." The drawing result is as shown in FIG. 16. Hereafter, because each of the polygon drawing processes on the symbol 4 of having a drawing data number of 2 and the symbol 8 having a drawing data number of 3 is made to pass through the same path as that through which the polygon drawing process on the symbol 6 having a drawing data number of 1 is made to pass, the explanation of the polygon drawing processes will be omitted. When the polygon drawing process on the symbol 8 having a drawing data number of 3 is completed, the previous cache hit flag 35 is set to "TRUE", the texture to be used is switched to the texture atlas "1", and the drawing result is as shown in FIG. 17.

Because the symbol cache checking part 33 determines that the image of the symbol 10 is not written in a texture in the polygon drawing process on the symbol 10 having the next drawing data number of 4, the symbol cache checking part determines a non-cache hit, the original texture generating unit 37 generates an original texture, and the previous cache hit flag is set to "FALSE." The original texture has the same size as the symbol size, and is the one in which the image of the symbol 10 is drawn. In this case, a texture having a size of 100×100 in which the image of the symbol 10 is drawn is generated.

Figure 18:
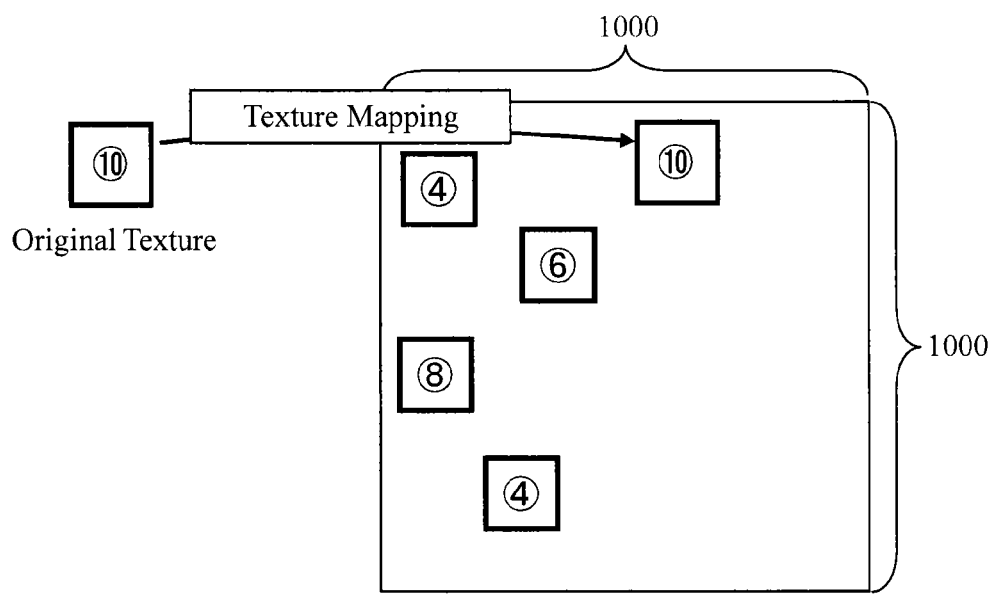
FIG. 18 is an explanatory drawing showing a drawing result acquired by the polygon drawing unit 40.

After that, the texture-to-be-used switching unit 38 switches the texture to be used to the original texture, and the texture coordinate setting unit 39 calculates the texture coordinates to be set as the vertices of the polygon. In this case, because the result acquired by the symbol cache checking part 33 shows a non-cache hit, the texture coordinates calculated according to the above-mentioned equation (5) are set. After that, the polygon drawing unit 40 carries out polygon drawing by using both the polygon generated by the polygon generating unit 32 and the texture to be used. The drawing result is as shown in FIG. 18.

Figure 19:
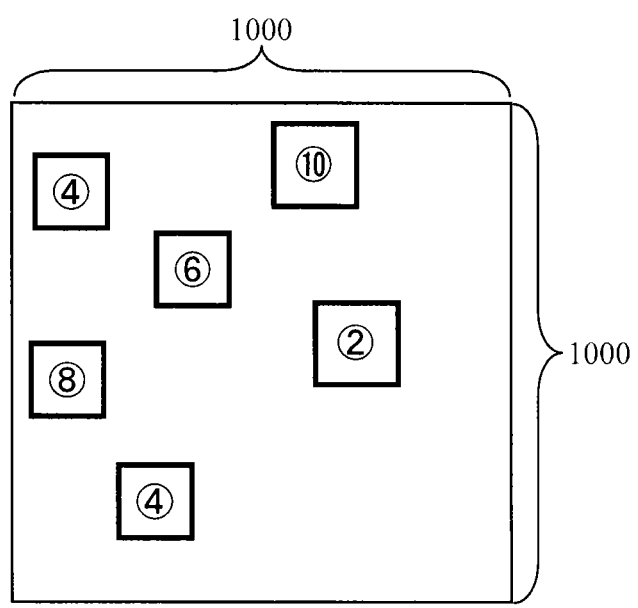
FIG. 19 is an explanatory drawing showing a drawing result acquired by the polygon drawing unit 40.

Next, the polygon drawing unit shifts to the polygon drawing process on the symbol 2 having a drawing data number of 5. Because this polygon drawing process is made to pass through the same path as that through which the polygon drawing process on the symbol 4 having a drawing data number of 0 is made to pass, the explanation of the polygon drawing process will be omitted hereafter. After the polygon drawing process on the symbol 2 having a drawing data number of 5 is completed, the drawing processing unit 5 ends the polygon drawing process because no next drawing data is acquired in the process of acquiring the next drawing symbol data. Finally, a map display on which the symbols are drawn as shown in FIG. 19 is produced.

As can be seen from the above description, the map symbol drawing device in accordance with this Embodiment 1 is constructed in such a way that the map symbol drawing device includes: the texture generating part 12 for generating one or more textures within limits of a maximum size of a memory which can be used as textures; the number-of-references calculating unit 14 for counting the number of references per symbol type to symbols existing in a map; the image writing unit 19 for acquiring the image of each of a number of symbols having a larger number of references per symbol type which is counted by the number-of-references calculating unit 14 from among the symbols existing in the map to write the image of each of the number of symbols having a larger number of references in a texture generated by the texture generating part 12; the symbol information storage part 20 for storing symbol information showing the type and the write position of each of the symbols whose images are written in the texture by the image writing unit 19 in the symbol information cache 21; the polygon generating unit 32 for generating the vertices of a 3D polygon according to the display coordinates of a symbol to be drawn; the symbol cache checking part 33 for referring to the symbol information stored in the symbol information storage cache 21 to check to see whether or not the image of a symbol of the same type as the symbol to be drawn is written in the texture; and the texture coordinate setting unit 39 for, when the symbol cache checking part 33 determines that the image of a symbol of the same type as the symbol to be drawn is written in the texture, and setting the write position of the above-mentioned symbol in the texture to the vertices of the 3D polygon generated by the polygon generating unit 32 as texture coordinates, otherwise setting the texture coordinates of an original texture generated by the original texture generating unit 37 to the vertices of the 3D polygon generated by the polygon generating unit 32, and the polygon drawing unit 40 draws the 3D polygon in which the texture coordinates are set by the texture coordinate setting unit 39. Therefore, there is provided an advantage of being able to draw symbols in a map at a high speed even when no large memory area is installed in the map symbol drawing device.

Further, because the texture-to-be-used switching unit 38 in accordance with this Embodiment 1 is constructed in such a way as not to perform a setup to switch the texture to be used at the time of polygon drawing to another texture when the previous cache hit flag 35 is "TRUE" (when the texture in which the image of a symbol of the same type as the symbol to be drawn is written is the same as the texture used at the time of the previous polygon drawing), there is provided an advantage of being able to provide an improvement in the speed of the process of drawing symbols. In addition, because the map symbol drawing device combines a number of symbols having a higher use frequency in the map into one texture atlas on a priority basis, there is provided an advantage of being able to increase the probability that a cache hit is detected continuously for one texture atlas, thereby being able to efficiently reduce the frequency with which the process of switching between textures is carried out.

Embodiment 2

Although the map symbol drawing device that provides an improvement in the speed of the process of drawing symbols is explained in above-mentioned Embodiment 1, a map symbol drawing device that has a function of accepting a change in the scale of a map and that provides an improvement in the speed of the process of drawing symbols will be explained in this Embodiment 2.

Figure 20:
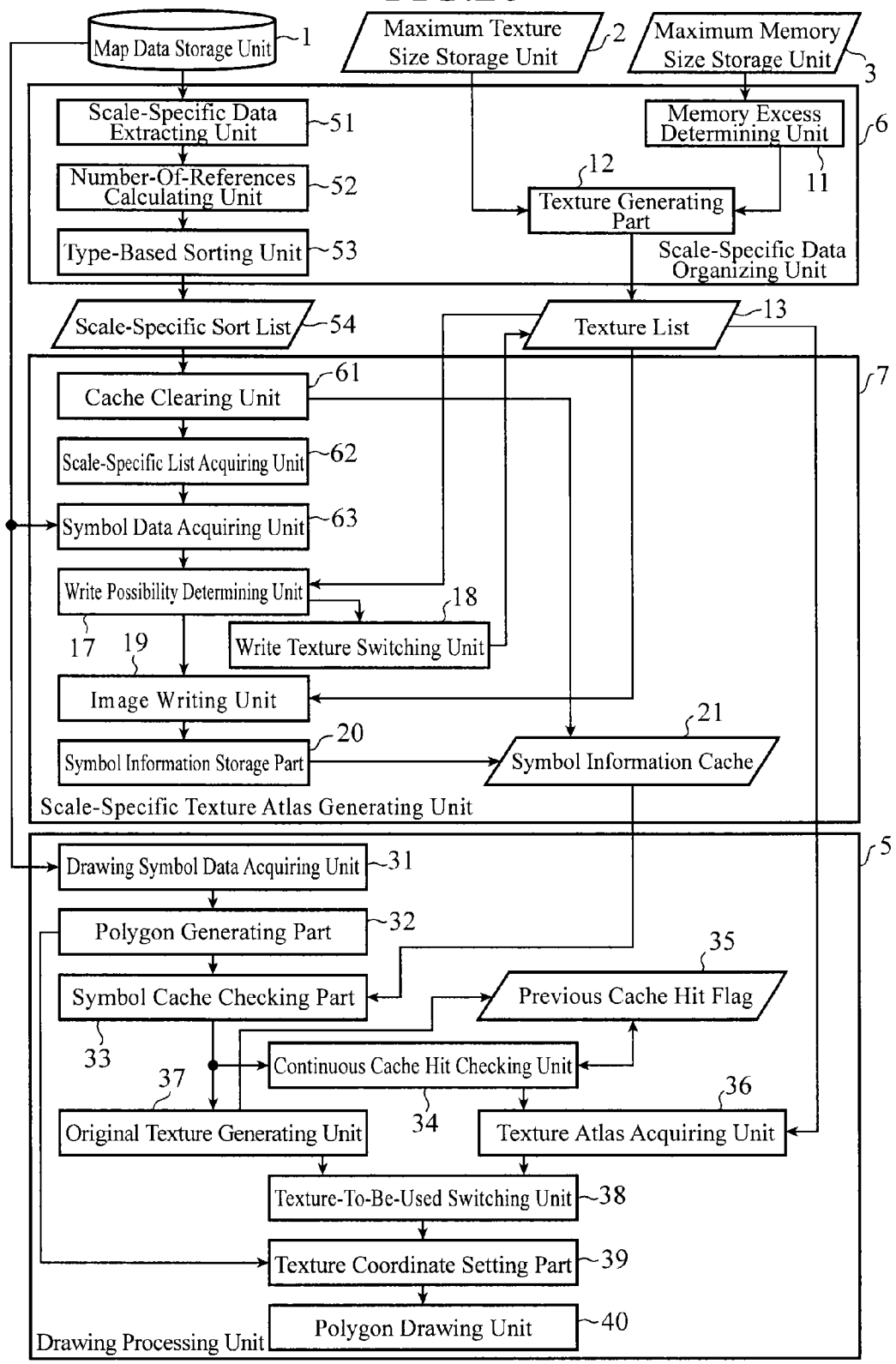
FIG. 20 is a block diagram showing a map symbol drawing device in accordance with Embodiment 2 of the present invention.

FIG. 20 is a block diagram showing the map symbol drawing device in accordance with Embodiment 2 of the present invention. In the figure, because the same reference numerals as those shown in FIG. 1 denote the same components or like components, the explanation of the components will be omitted hereafter. A scale-specific data organizing unit 6 consists of, for example, a semiconductor circuit in which a CPU or the like is mounted, a one chip microcomputer, or the like, and is a processing unit for carrying out a process of counting the number of references per symbol type to symbols existing in a map according to the scale of the map at a time when the map symbol drawing device is started. A scale-specific texture atlas generating unit 7 consists of, for example, a semiconductor circuit in which a CPU or the like is mounted, a one chip microcomputer, or the like, and is a processing unit for carrying out a process of acquiring the images of a number of symbols corresponding to a specified scale and having a larger number of references per symbol type from among the symbols existing in the map having the above-mentioned scale to write the images of the symbols having a larger number of references in a texture, a process of storing symbol information showing the type and the write position of each of the symbols, and so on at a time when the scale of the map is changed. Processing carried out by a drawing processing unit 5 is the same as that in accordance with above-mentioned Embodiment 1.

A scale-specific data extracting unit 51 carries out a process of extracting the symbols existing in a map according to the scale of the map by referring to map data stored in a map data storage unit 1. A number-of-references calculating unit 52 carries out a process of counting the number of references per symbol type to the symbols extracted by the scale-specific data extracting unit 51 according to the scale of the map. A type-based sorting unit 53 carries out a process of sorting the types of the symbols in descending order of the number of references which is counted by the number-of-references calculating unit 52 according to the scale of the map, and recording the sorted result in a scale-specific sorted list 54. A number-of-references counting unit is comprised of the scale-specific data extracting unit 51, the number-of-references calculating unit 52, and the type-based sorting unit 53.

A cache clearing unit 61 carries out a process of erasing symbol information held by a symbol information cache 21 at a time when the scale of the map is changed. A scale-specific list acquiring unit 62 carries out a process of acquiring the sorted result which corresponds to the specified scale and which is acquired by the type-based sorting unit 53 from the scale-specific sorted list 54. A symbol data acquiring unit 63 carries out a process of referring to the sorted result which corresponds to the specified scale and which is acquired by the type-based sorting unit 53 to acquire the symbol data about each of the symbols in the map having the specified scale (data showing the type, the image, and the size of each of the symbols) from the map data storage unit 1 in descending order starting from the symbol of the first symbol type in the sorted list. A symbol image writing unit is comprised of the cache clearing unit 61, the scale-specific list acquiring unit 62, the symbol data acquiring unit 63, a write possibility determining unit 17, a write texture switching unit 18, and an image writing unit 19.

Figure 21:
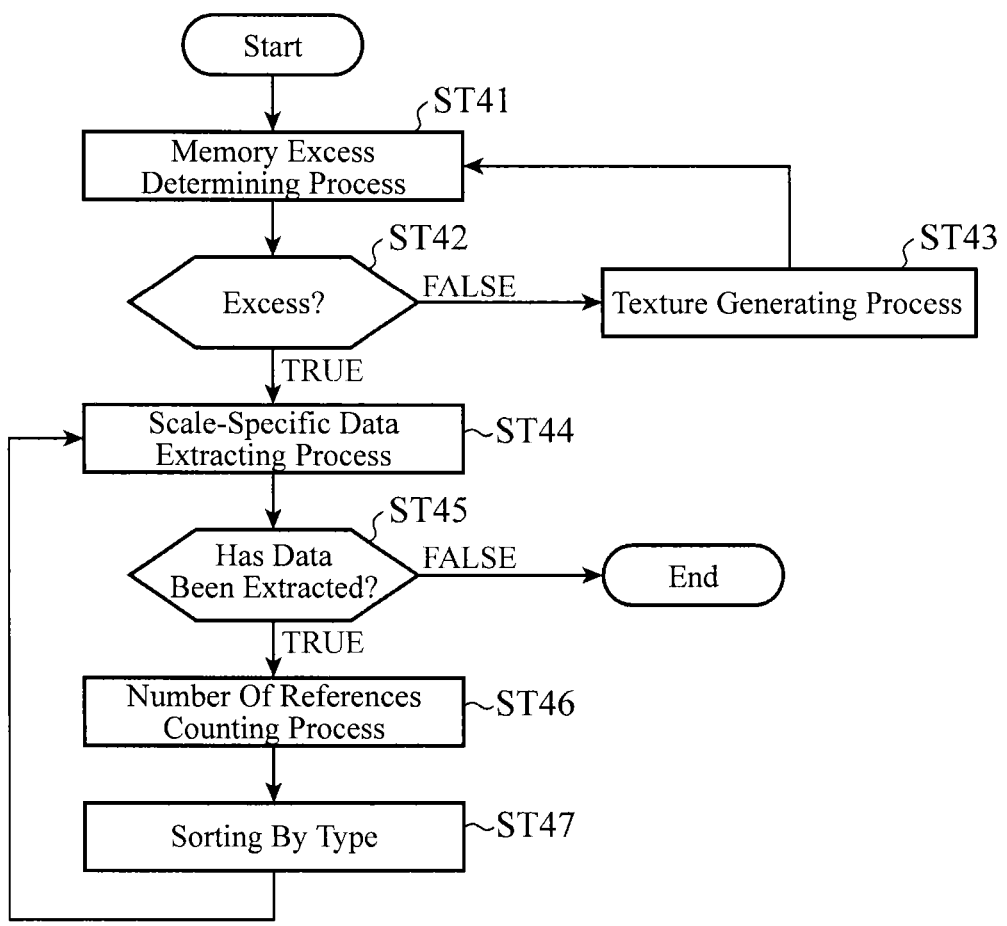
FIG. 21 is a flow chart showing processing carried out by a scale-specific data organizing unit 6 of the map symbol drawing device in accordance with Embodiment 2 of the present invention.
Figure 22:
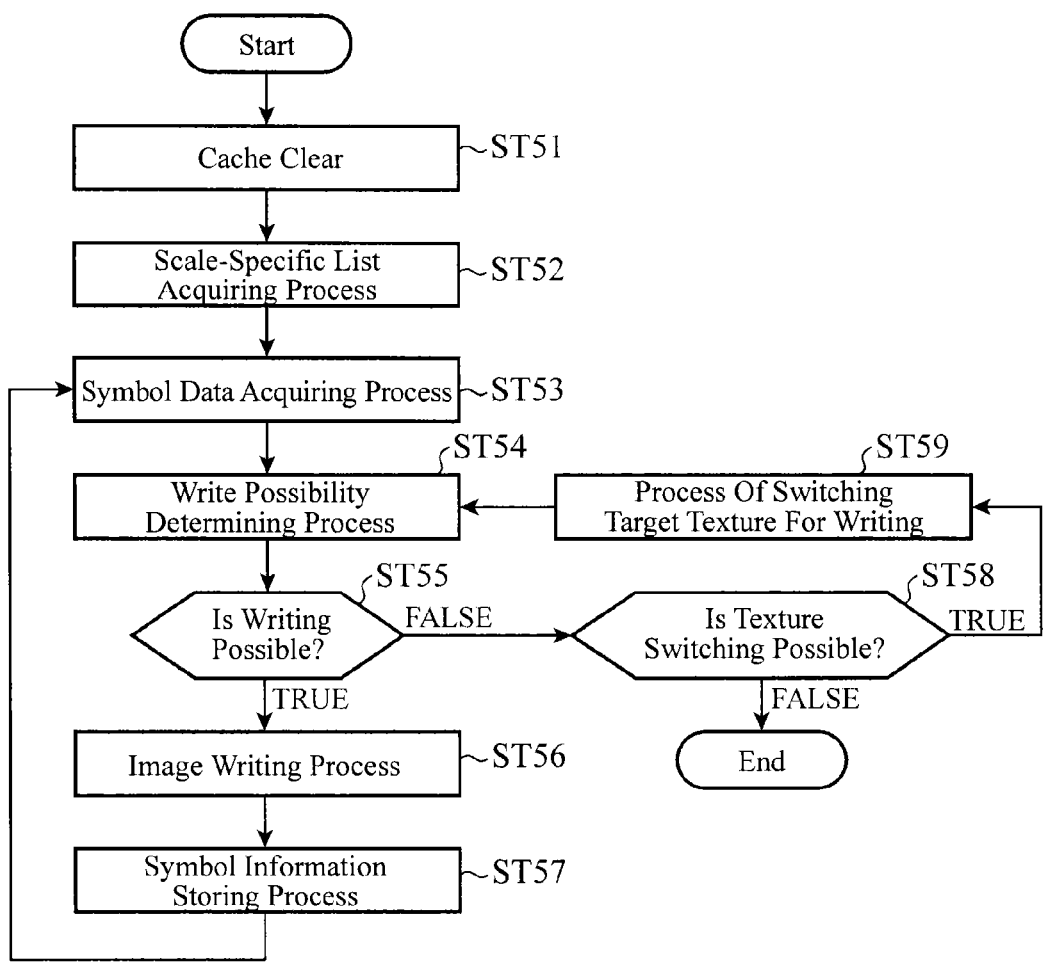
FIG. 22 is a flow chart showing processing carried out by a scale-specific texture atlas generating unit 7 of the map symbol drawing device in accordance with Embodiment 2 of the present invention.

In the example shown in FIG. 20, a memory excess determining unit 11, a texture generating part 12, the scale-specific data extracting unit 51, the number-of-references calculating unit 52, the type-based sorting unit 53, the cache clearing unit 61, the scale-specific list acquiring unit 62, the symbol data acquiring unit 63, the write possibility determining unit 17, the write texture switching unit 18, the image writing unit 19, a symbol information storage part 20, a drawing symbol data acquiring unit 31, a polygon generating unit 32, a symbol cache checking part 33, a continuous cache hit checking unit 34, a texture atlas acquiring unit 36, an original texture generating unit 37, a texture-to-be-used switching unit 38, a texture coordinate setting unit 39, and a polygon drawing unit 40, which are the components of the map symbol drawing device, can consist of pieces of hardware for exclusive use (e.g., semiconductor integrated circuits in each of which a CPU is mounted, one chip microcomputers, or the like), respectively. As an alternative, the map symbol drawing device can consist of a computer, and a program in which the processes carried out by the memory excess determining unit 11, the texture generating part 12, the scale-specific data extracting unit 51, the number-of-references calculating unit 52, the type-based sorting unit 53, the cache clearing unit 61, the scale-specific list acquiring unit 62, the symbol data acquiring unit 63, the write possibility determining unit 17, the write texture switching unit 18, the image writing unit 19, the symbol information storage part 20, the drawing symbol data acquiring unit 31, the polygon generating unit 32, the symbol cache checking part 33, the continuous cache hit checking unit 34, the texture atlas acquiring unit 36, the original texture generating unit 37, the texture-to-be-used switching unit 38, the texture coordinate setting unit 39, and the polygon drawing unit 40 are described can be stored in a memory of the computer and the CPU of the computer can be made to execute the program stored in the memory. FIG. 21 is a flow chart showing the processing carried out by the scale-specific data organizing unit 6 of the map symbol drawing device in accordance with Embodiment 2 of the present invention. FIG. 22 is a flow chart showing the processing carried out by the scale-specific texture atlas generating unit 7 of the map symbol drawing device in accordance with Embodiment 2 of the present invention.

Next, the operation of the map symbol drawing device will be explained. In this Embodiment 2, for the sake of simplicity, it is assumed that a map display unit has a map display screen size of 1,000×1,000 and the map data include 1,000 types of symbols. Further, it is assumed that two scales; a 100-m scale and a 200-m scale are prepared as scales with each of which a map can be displayed. FIG. 23 is an explanatory drawing showing an example of the number of references (use count) per symbol type to symbols existing in a map having a 100-m scale, and the number of references (use count) per symbol type to symbols existing in a map having a 200-m scale. Further, in this Embodiment 2, it is assumed that the size of each symbol is 100×100 [pixel], a maximum texture size is 200×200 [pixel], and a maximum memory size is 200×500 [pixel] (refer to the FIG. 5).

It is also assumed that when the map symbol drawing device is started, a used memory size is "0", a texture list 13 is empty, a write texture index is "0", and write start coordinates are (0, 0). It is further assumed that drawing symbol data are a set of six pairs of window coordinates and symbol types as shown in FIG. 6, and a previous cache hit flag 35 is "FALSE." In this case, a coordinate system for textures and a display window coordinate system are defined with their upper left corners being set as a point of origin, and their X axial directions are oriented to the right and their Y axis directions are oriented to the lower.

First, the processing carried out by the scale-specific data organizing unit 6 will be explained. The memory excess determining unit 11 compares the total size $Tsize_{NOW}$ of one or more textures which are already generated for the memory available as textures with the maximum memory size $M_{MAX}$ stored in the maximum memory size storage unit 3 to determine whether or not it is possible to newly generate a texture. More specifically, when the addition of the maximum size $Tsize_{MAX}$ of a texture which is to be newly generated (the maximum texture size stored in the maximum texture size storage unit 2) to the total size $Tsize_{NOW}$ of one or more textures which are already generated results in an excess from the maximum memory size $MEM_{MAX}$, the memory excess determining unit 11 determines that it is impossible to newly generate a texture because the addition result exceeds the maximum memory size (steps ST41 and ST42 of FIG. 21). In contrast, when the addition result does not exceed the maximum memory size $MEM_{MAX}$, the memory excess determining unit determines that it is possible to newly generate a texture (steps ST41 and ST42).

Because the total size $Tsize_{NOW}$ (used memory size) of one or more textures which are already generated at a time when the map symbol drawing device is started is "0", $Tsize_{NOW}$+ $Tsize_{rmx}$ is "200×200" and hence does not exceed the maximum memory size of "200×500", the memory excess determining unit determines that it is possible to newly generate a texture.

When the memory excess determining unit 11 determines that it is possible to newly generate a texture, the texture generating part 12 generates a texture having the maximum texture size of $Tsize_{MAX}$ (texture having a size of 200×200), like that in accordance with above-mentioned Embodiment 1 (step ST43). The texture generating part 12 also adds information about the texture generated thereby to the texture list 13. After the texture generating part 12 newly generates a texture, the texture atlas generating unit adds the maximum texture size $Tsize_{MAX}$ to the used memory size and then returns to the memory excess determining process of step ST41 again. When the maximum texture size is 200×200 [pixel] and the maximum memory size is 200×500 [pixel], as mentioned above, two textures each having a size of 200×200 can be generated, but an excess in the memory is expected when a third texture is generated. Therefore, the texture generating unit does not generate anymore texture after generating two textures and shifts to the process of step ST44.

The scale-specific data extracting unit 51 refers to the map data stored in the map data storage unit 1 to extract the symbols existing in the map for each scale (step ST44). In this Embodiment 2, for the sake of simplicity, it is assumed that the scale-specific data extracting unit extracts the symbols existing in the map having a 100-m scale first, and, when the map symbol drawing device returns to the process of step ST44, the scale-specific data extracting unit extracts the symbols existing in the map having a 200-m scale. After the scale-specific data extracting unit 51 extracts the symbols existing in the map for each of the scales (step ST45), the number-of-references calculating unit 52 counts the number of references per symbol type to the symbols extracted by the scale-specific data extracting unit 51 for each of the map scales (step ST46). For example, the number-of-references calculating unit can implement the process of counting the number of references per symbol type to the symbols existing in a map having a specified scale by extracting the symbol data about each of all the symbols existing in the map from the map data storage unit 1. In this Embodiment 2, it is assumed that the number of references (use count) per symbol type as shown in FIG. 23 is acquired for each of 1,000 symbols.

Figures 24, 25:
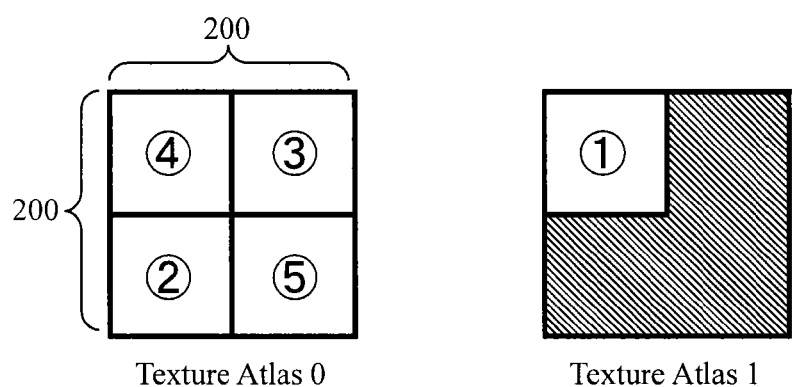
FIG. 24 is an explanatory drawing showing a sorted result acquired by a type-based sorting unit 53.
FIG. 25 is an explanatory drawing showing a texture atlas corresponding to a 100-m scale.

After the number-of-references calculating unit 52 counts the number of references per symbol type to the symbols, the type-based sorting unit 53 sorts the types of the symbols in descending order of the counted number of references, as shown in FIG. 24 (step ST47). In the example of FIG. 24, the numbers of references per symbol type to the symbols showing the counted results acquired by the number-of-references calculating unit 52 are sorted in descending order (for example, sorted according to a merge sort algorithm), and the symbols are aligned in order of the symbol 4, the symbol 3, the symbol 2, the symbol 5, . . . for the map of a 100-m scale. Further, the symbols are aligned in order of the symbol 5, the symbol 7, the symbol 9, the symbol 8, . . . for the map of a 200-m scale. In this Embodiment 2, a list showing the sorted result for the map having a 100-m scale will be referred to as "sorted list 0" and a list showing the sorted result for the map having a 200-m scale is referred to as "sorted list 1."

Next, the processing carried out by the scale-specific texture atlas generating unit 7 which operates at a time when the scale of the map is changed will be explained. First, the cache clearing unit 61 erases the symbol information held by the symbol information cache 21 at a time when the scale of the map is changed (step ST51 of FIG. 22). The scale-specific list acquiring unit 62 acquires the sorted result which corresponds to the specified scale and which is acquired by the type-based sorting unit 53 from the scale-specific sorted list 54 (step ST52). In this Embodiment 2, for the sake of simplicity, it is assumed that the display scale is a 100-m one. In this case, the scale-specific list acquiring unit acquires the sorted list 0 showing the sorted result acquired for the map having a 100-m scale.

The symbol data acquiring unit 63 refers to the sorted result which corresponds to the specified scale and which is acquired by the type-based sorting unit 53 to acquire the symbol data about each of the symbols existing in the map having the specified scale (data showing the type, the image, and the size of each of the symbols) from the map data storage unit 1 in descending order starting from the symbol of the first symbol type in the sorted list (step ST53). In this Embodiment 2, the symbol data acquiring unit refers to the sorted list 0 showing the sorted result acquired for the map having a 100-m scale to acquire the symbol data about each of the symbols existing in the map having a 100-m scale from the map data storage unit 1 in descending order starting from the symbol of the first symbol type in the sorted list.

Figures 26, 27, 28:
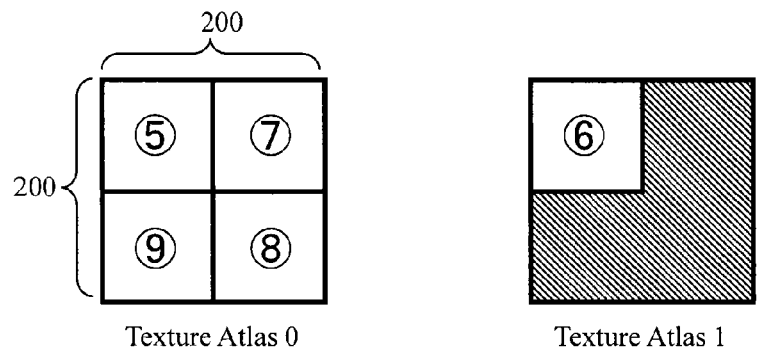
FIG. 26 is an explanatory drawing showing symbol information about top five symbols 4, 3, 2, 5, and 1 stored in a symbol information cache 21.
FIG. 27 is an explanatory drawing showing a texture atlas corresponding to a 200-m scale.
FIG. 28 is an explanatory drawing showing symbol information about top five symbols 5, 7, 9, 8, and 6 stored in a symbol information cache 21.

Every time when the symbol data acquiring unit 63 acquires symbol data, the write possibility determining unit 17 determines whether or not it is possible to write the image of the symbol shown by the symbol data in a texture generated by the texture generating part 12 (the texture in the texture list 13 which is indicated by the write texture index), like that in accordance with above-mentioned Embodiment 1 (step ST54). After that, the write texture switching unit 18, the image writing unit 19, and the symbol information storage part 20 operate in the same way that those in accordance with above-mentioned Embodiment 1 operate (steps ST55 to ST59). As a result, texture atlases 0 and 1 as shown in FIG. 25 (texture atlases corresponding to the 100-m scale) are generated, and a symbol information cache as shown in FIG. 26 is generated. When updating the drawing of the map, the drawing processing unit 5 operates to carry out a process of drawing a 3D polygon in the same way that the drawing processing unit in accordance with above-mentioned Embodiment 1 does.

Next, processing carried out by the map symbol drawing device when the scale of the map is changed from a 100-m scale to a 200-m scale will be explained. First, the cache clearing unit 61 erases the symbol information associated with the 100-m scale which is held by the symbol information cache 21 (step ST51 of FIG. 22). The scale-specific list acquiring unit 62 acquires the sorted result which corresponds to the specified scale and which is acquired by the type-based sorting unit 53 from the scale-specific sorted list 54 (step ST52). In this Embodiment 2, the scale-specific list acquiring unit acquires the sorted list 1 showing the sorted result acquired for the map having a 200-m scale.

The symbol data acquiring unit 63 refers to the sorted result which corresponds to the specified scale and which is acquired by the type-based sorting unit 53 to acquire the symbol data about each of the symbols existing in the map having the specified scale (data showing the type, the image, and the size of each of the symbols) from the map data storage unit 1 in descending order starting from the symbol of the first symbol type in the sorted list (step ST53). In this case, the symbol data acquiring unit refers to the sorted list 1 showing the sorted result acquired for the map having a 200-m scale to acquire the symbol data about each of the symbols existing in the map having a 200-m scale from the map data storage unit 1 in descending order starting from the symbol of the first symbol type in the sorted list.

Every time when the symbol data acquiring unit 63 acquires symbol data, the write possibility determining unit 17 determines whether or not it is possible to write the image of the symbol shown by the symbol data in a texture generated by the texture generating part 12 (the texture in the texture list 13 which is indicated by the write texture index), like that in accordance with above-mentioned Embodiment 1. After that, the write texture switching unit 18, the image writing unit 19, and the symbol information storage part 20 operate in the same way that those in accordance with above-mentioned Embodiment 1 operate (steps ST55 to ST59). As a result, texture atlases 0 and 1 as shown in FIG. 27 (texture atlases corresponding to the 200-m scale) are generated, and a symbol information cache as shown in FIG. 28 is generated. When updating the drawing of the map, the drawing processing unit 5 operates to carry out a process of drawing a 3D polygon in the same way that the drawing processing unit in accordance with above-mentioned Embodiment 1 does.

As can be seen from the above description, the map symbol drawing device in accordance with this Embodiment 2 is constructed in such a way that the number-of-references calculating unit 52 counts the number of references per symbol type to symbols existing in a map for each map scale, the symbol data acquiring unit 63 acquires the images of a number of symbols corresponding to a specified scale and having a larger number of references per symbol type from among the symbols existing in the map having the above-mentioned scale, the image writing unit 19 writes the images of the number of symbols having a larger number of references in a texture generated by the texture generating part 12, and the symbol information storage part 20 stores symbol information showing the type and the position of each of the symbols whose images are written in the texture by the image writing unit 19 in the symbol information cache 21. Therefore, there is provided an advantage of being able to draw symbols in a map at a high speed even when the scale of the map is changed. More specifically, because the map symbol drawing device combines symbols having a high use frequency into one texture atlas on a priority basis for each display scale, the cache hit for the texture atlas according to the display scale is optimized. As a result, the texture switching process can be eliminated efficiently.

Embodiment 3

Although the map symbol drawing device that provides an improvement in the speed of the process of drawing symbols is explained in above-mentioned Embodiment 1, a map symbol drawing device that provides an improvement in the speed of the process of drawing symbols at a time when a display area of a map is changed will be explained in this Embodiment 3.

Figure 29:
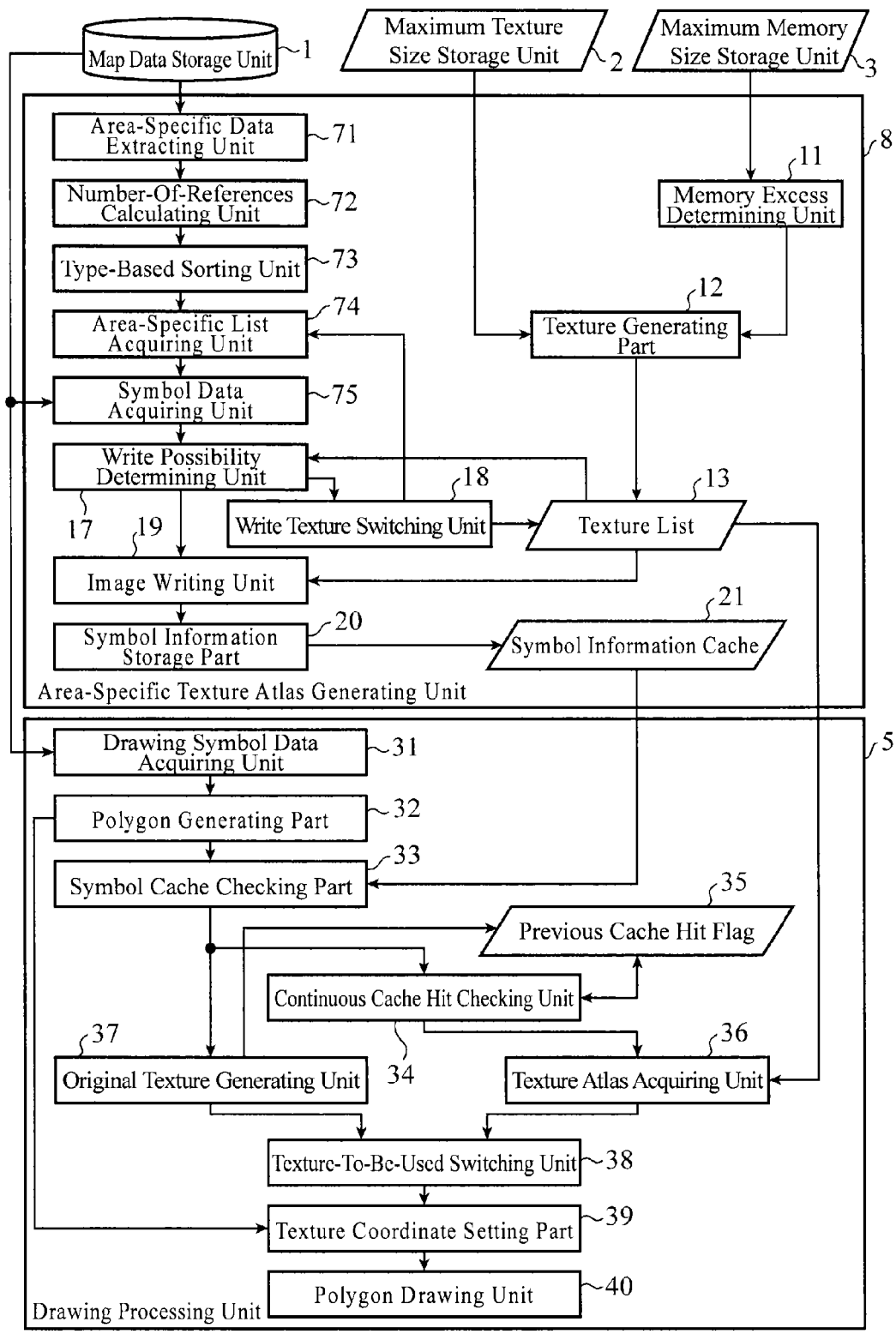
FIG. 29 is a block diagram showing a map symbol drawing device in accordance with Embodiment 3 of the present invention.

FIG. 29 is a block diagram showing the map symbol drawing device in accordance with Embodiment 3 of the present invention. In the figure, because the same reference numerals as those shown in FIG. 1 denote the same components or like components, the explanation of the components will be omitted hereafter. An area-specific texture atlas generating unit 8 consists of, for example, a semiconductor circuit in which a CPU or the like is mounted, a one chip microcomputer, or the like, and is a processing unit for carrying out a process of counting the number of references per symbol type to symbols existing in each area of a map, a process of acquiring the images of a number of symbols corresponding to a certain area and having a larger number of references per symbol type from among symbols existing in maps of a plurality of areas to write the images of the symbols having a larger number of references in a texture, a process of storing symbol information showing the type and the write position of each of the symbols, and so on at a time when the map symbol drawing device is started. Processing carried out by a drawing processing unit 5 is the same as that in accordance with above-mentioned Embodiment 1.

An area-specific data extracting unit 71 carries out a process of referring to map data stored in a map data storage unit 1 to extract symbols existing in each area of a map. A number-of-references calculating unit 72 carries out a process of counting the number of references per symbol type to the symbols extracted by the area-specific data extracting unit 71 for each area of the map. A type-based sorting unit 73 carries out a process of sorting the types of the symbols in descending order of the number of references counted by the number-of-references calculating unit 72 for each area of the map. A number-of-references counting unit is comprised of the area-specific data extracting unit 71, the number-of-references calculating unit 72, and the type-based sorting unit 73.

An area-specific list acquiring unit 74 carries out a process of acquiring the sorted result corresponding to an area which is a target for generation of a texture atlas from among the area-specific sorted results acquired by the type-based sorting unit 73. A symbol data acquiring unit 75 carries out a process of referring to the sorted result acquired by the area-specific list acquiring unit 74 to acquire the symbol data about each of the symbols in the area which is the target for generation of a texture atlas in the map (data showing the type, the image, and the size of each of the symbols) from the map data storage unit 1 in descending order starting from the symbol of the first symbol type in the sorted list. A symbol image writing unit is comprised of the area-specific list acquiring unit 74, the symbol data acquiring unit 75, a write possibility determining unit 17, a write texture switching unit 18, and an image writing unit 19.

In the example of FIG. 29, a memory excess determining unit 11, a texture generating part 12, the area-specific data extracting unit 71, the number-of-references calculating unit 72, the type-based sorting unit 73, the area-specific list acquiring unit 74, the symbol data acquiring unit 75, the write possibility determining unit 17, the write texture switching unit 18, the image writing unit 19, a symbol information storage part 20, a drawing symbol data acquiring unit 31, a polygon generating unit 32, a symbol cache checking part 33, a continuous cache hit checking unit 34, a texture atlas acquiring unit 36, an original texture generating unit 37, a texture-to-be-used switching unit 38, a texture coordinate setting unit 39, and a polygon drawing unit 40, which are the components of the map symbol drawing device, can consist of pieces of hardware for exclusive use (e.g., semiconductor integrated circuits in each of which a CPU is mounted, one chip microcomputers, or the like), respectively. As an alternative, the map symbol drawing device can consist of a computer, and a program in which the processes carried out by the memory excess determining unit 11, the texture generating part 12, the area-specific data extracting unit 71, the number-of-references calculating unit 72, the type-based sorting unit 73, the area-specific list acquiring unit 74, the symbol data acquiring unit 75, the write possibility determining unit 17, the write texture switching unit 18, the image writing unit 19, the symbol information storage part 20, the drawing symbol data acquiring unit 31, the polygon generating unit 32, the symbol cache checking part 33, the continuous cache hit checking unit 34, the texture atlas acquiring unit 36, the original texture generating unit 37, the texture-to-be-used switching unit 38, the texture coordinate setting unit 39, and the polygon drawing unit 40 are described can be stored in a memory of the computer and the CPU of the computer can be made to execute the program stored in the memory.

Figure 30:
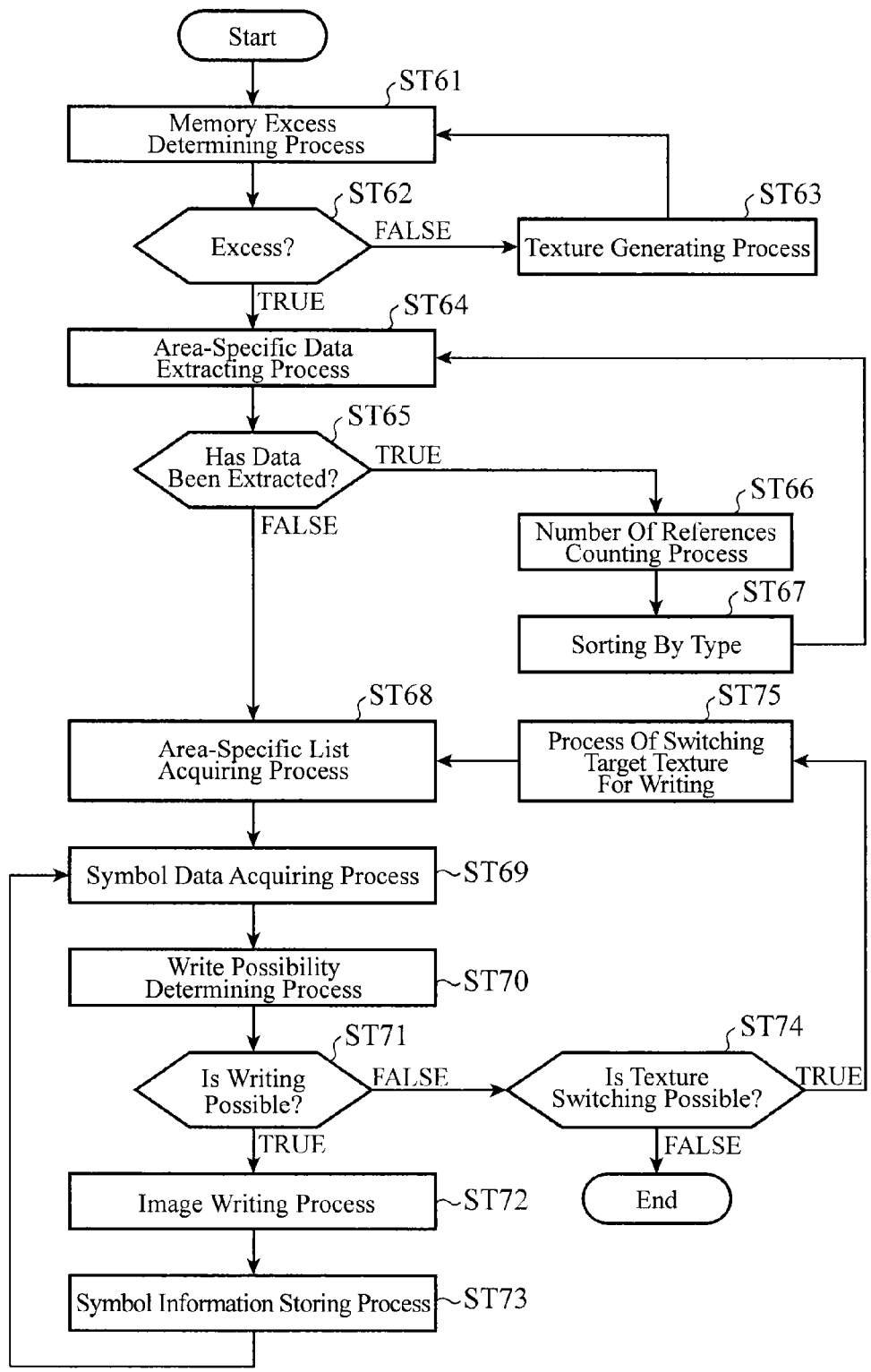
FIG. 30 is a flow chart showing processing carried out by an area-specific texture atlas generating unit 8 of the map symbol drawing device in accordance with Embodiment 3 of the present invention.

FIG. 30 is a flow chart showing the processing carried out by the area-specific texture atlas generating unit 8 of the map symbol drawing device in accordance with Embodiment 3 of the present invention.

Next, the operation of the map symbol drawing device will be explained. In this Embodiment 3, for the sake of simplicity, it is assumed that a map display unit has a map display screen size of 1,000×1,000 and the map data include 1,000 types of symbols. It is further assumed that two areas: Tokyo and Osaka are prepared as an area whose map can be displayed. FIG. 31 is an explanatory drawing showing an example of the number of references (use count) per symbol type to symbols existing in a map of an area which is Tokyo, and the number of references (use count) per symbol type to symbols existing in a map of an area which is Osaka. Further, in this Embodiment 2, it is assumed that the size of each symbol is 100×100 [pixel], a maximum texture size is 200×200 [pixel], and a maximum memory size is 200×500 [pixel] (refer to the FIG. 5).

It is also assumed that when the map symbol drawing device is started, a used memory size is "0", a texture list 13 is empty, a write texture index is "0", and write start coordinates are (0, 0). It is further assumed that drawing symbol data are a set of six pairs of window coordinates and symbol types as shown in FIG. 6, and a previous cache hit flag 35 is "FALSE." In this case, a coordinate system for textures and a display window coordinate system are defined with their upper left corners being set as a point of origin, and their X axial directions are oriented to the right and their Y axis directions are oriented to the lower.

The memory excess determining unit 11 of the texture atlas generating unit 4 compares the total size $Tsize_{NOW}$ of one or more textures which are already generated for the memory available as textures with the maximum memory size $M_{MAX}$ stored in the maximum memory size storage unit 3 to determine whether or not it is possible to newly generate a texture. More specifically, when the addition of the maximum size $Tsize_{MAX}$ of a texture which is to be newly generated (the maximum texture size stored in the maximum texture size storage unit 2) to the total size $Tsize_{NOW}$ of one or more textures which are already generated results in an excess from the maximum memory size $MEM_{MAX}$, as shown in the following equation (1), the memory excess determining unit 11 determines that it is impossible to newly generate a texture because the addition result exceeds the maximum memory size (steps ST61 and ST62 of FIG. 30). In contrast, when the addition result does not exceed the maximum memory size $MEM_{MAX}$, the memory excess determining unit determines that it is possible to newly generate a texture (steps ST61 and ST62).

Because the total size $Tsize_{NOW}$ (used memory size) of one or more textures which are already generated at a time when the map symbol drawing device is started is "0", $Tsize_{NOW}$+ $Tsize_{MAX}$ is "200×200" and hence does not exceed the maximum memory size of "200×500", the memory excess determining unit determines that it is possible to newly generate a texture.

When the memory excess determining unit 11 determines that it is possible to newly generate a texture, the texture generating part 12 generates a texture having the maximum texture size of $Tsize_{MAX}$ (texture having a size of 200×200) (step ST63). The texture generating part 12 also adds information about the texture generated thereby to the texture list 13. After the texture generating part 12 newly generates a texture, the texture atlas generating unit adds the maximum texture size $Tsize_{MAX}$ to the used memory size and then returns to the memory excess determining process of step ST61 again. When the maximum texture size is 200×200 [pixel] and the maximum memory size is 200×500 [pixel], as mentioned above, two textures each having a size of 200×200 can be generated, but an excess in the memory is expected when a third texture is generated. Therefore, the texture generating unit does not generate anymore texture after generating two textures and shifts to the process of step ST64.

The area-specific data extracting unit 71 refers to the map data stored in the map data storage unit 1 to extract the symbols existing in the map for each area (step ST64). In this Embodiment 3, for the sake of simplicity, it is assumed that the area-specific data extracting unit extracts the symbols existing in the map of the area which is Tokyo first, and, when returning to the process of step ST64 the next time, extracts the symbols existing in the map of the area which is Osaka. After the area-specific data extracting unit 71 extracts the symbol existing in in the map for each area (step ST65), the number-of-references calculating unit 72 counts the number of references per symbol type to the symbols extracted by the area-specific data extracting unit 71 for each map area (step ST66). For example, the number-of-references calculating unit can implement the process of counting the number of references per symbol type to the symbols existing in the map of Tokyo or Osaka by extracting the symbol data about each of all the symbols existing in the map of in Tokyo or Osaka from the map data storage unit 1. In this Embodiment 3, it is assumed that the number of references (use count) per symbol type as shown in FIG. 31 is acquired for each of 1,000 symbols.

After the number-of-references calculating unit 72 counts the number of references per symbol type to the symbols, the type-based sorting unit 73 sorts the types of the symbols in descending order of the counted number of references, as shown in FIG. 32 (step ST67). In the example of FIG. 32, the numbers of references per symbol type to the symbols showing the counted results acquired by the number-of-references calculating unit 52 are sorted in descending order (for example, sorted according to a merge sort algorithm), and the symbols are aligned in order of the symbol 4, the symbol 3, the symbol 2, the symbol 5, . . . for the map of the area which is Tokyo. Further, the symbols are aligned in order of the symbol 5, the symbol 7, the symbol 9, the symbol 8, . . . for the map of the area which is Osaka. In this Embodiment 3, a list showing the sorted result for the map of the area which is Tokyo will be referred to as "sorted list 0 " and a list showing the sorted result for the map of the area which is Osaka is referred to as "sorted list 1."

The area-specific list acquiring unit 74 acquires the sorted list showing the sorted result corresponding to the area which is the target for generation of a texture atlas among the area-specific sorted results acquired by the type-based sorting unit 73 (step ST68). In this embodiment, for the sake of simplicity, it is assumed that the area-specific list acquiring unit acquires the sorted list 0 showing the sorted result for the map of the area which is Tokyo. After the area-specific list acquiring unit 74 acquires the sorted list 0, the symbol data acquiring unit 75 refers to the sorted list 0 to acquire the symbol data about each of the symbols existing in the map of the area which is Tokyo (data showing the type, the image, and the size of each of the symbols) from the map data storage unit 1 in descending order starting from the symbol of the first symbol type in the sorted list (step ST69).

Every time when the symbol data acquiring unit 75 acquires symbol data, the write possibility determining unit 17 determines whether or not it is possible to write the image of the symbol shown by the symbol data in a texture generated by the texture generating part 12 (the texture in the texture list 13 which is indicated by the write texture index), like that in accordance with above-mentioned Embodiment 1 (step ST70). After that, the write texture switching unit 18, the image writing unit 19, and the symbol information storage part 20 operate in the same way that those in accordance with above-mentioned Embodiment 1 operate (steps ST71 to ST75). As a result, a texture atlas 0 as shown in FIG. 33 (a texture atlas of the area which is Tokyo) is generated, and a symbol information cache as shown in FIG. 34 is generated.

Next, the area-specific list acquiring unit 74 acquires the sorted list 1 showing the sorted result for the map of the area which is Osaka (step ST68). After the area-specific list acquiring unit 74 acquires the sorted list 1, the symbol data acquiring unit 75 refers to the sorted list 1 to acquire the symbol data about each of the symbols existing in the map of the area which is Osaka (data showing the type, the image, and the size of each of the symbols) from the map data storage unit 1 in descending order starting from the symbol of the first symbol type in the sorted list (step ST69).

Figures 35, 36:
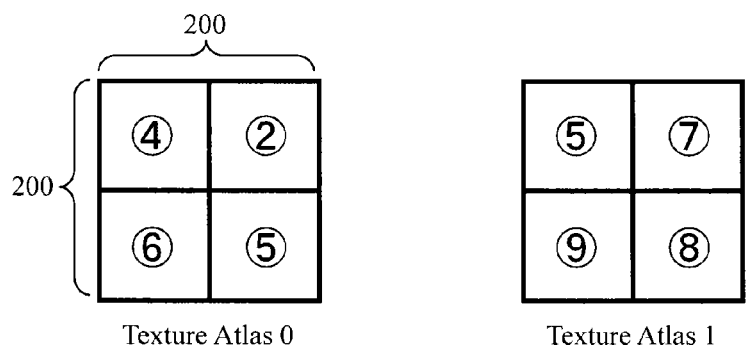
FIG. 35 is an explanatory drawing showing a texture atlas in a case in which a target area is Osaka.
FIG. 36 is an explanatory drawing showing symbol information about top eight symbols 4, 2, 6, 5, 5, 7, 9, and 8 stored in the symbol information cache 21.

Every time when the symbol data acquiring unit 75 acquires symbol data, the write possibility determining unit 17 determines whether or not it is possible to write the image of the symbol shown by the symbol data in a texture generated by the texture generating part 12 (the texture in the texture list 13 which is indicated by the write texture index), like that in accordance with above-mentioned Embodiment 1 (step ST70). After that, the write texture switching unit 18, the image writing unit 19, and the symbol information storage part 20 operate in the same way that those in accordance with above-mentioned Embodiment 1 operate (steps ST71 to ST75). As a result, a texture atlas 1 as shown in FIG. 35 (a texture atlas of the area which is Osaka) is generated, and a symbol information cache as shown in FIG. 36 is generated. When updating the drawing of the map, the drawing processing unit 5 operates to carry out a process of drawing a 3D polygon in the same way that the drawing processing unit in accordance with above-mentioned Embodiment 1 does.

As can be seen from the above description, the map symbol drawing device in accordance with this Embodiment 3 is constructed in such a way that the number-of-references calculating unit 72 counts the number of references per symbol type to symbols existing in a map for each map area, the symbol data acquiring unit 74 acquires the images of a number of symbols existing in a target area for generation of a texture atlas and having a larger number of references per symbol type from among symbols existing in maps of a plurality of areas, the image writing unit 19 writes the image of each of the symbols having a larger number of references in a texture generated by the texture generating part 12, and the symbol information storage part 20 stores symbol information showing the type and the write of each of the symbols which are written in the texture by the image writing unit 19 in the symbol information cache 21. Therefore, there is provided an advantage of being able to draw symbols in a map at a high speed even when the area whose map is to be displayed is changed. More specifically, because the map symbol drawing device combines symbols having a high use frequency into one texture atlas on a priority basis for each map area, the cache hit for the texture atlas according to the area whose map is to be displayed is optimized. As a result, the texture switching process can be eliminated efficiently.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

Industrial Applicability

Because the map symbol drawing device in accordance with the present invention does not have to have a large memory area when drawing symbols in a map at a high speed, the map symbol drawing device is suitable for use as a map display unit of embedded type such as a car navigation device in which a strong constraint is placed on the used memory size.

The invention claimed is:

1. A map symbol drawing device comprising:
a texture generating unit for generating one or more textures within limits of a maximum size in a memory which can be used as textures;
a number-of-references counting unit for counting a number of references per symbol type to symbols existing in a map;
a symbol image writing unit for acquiring images of a number of symbols having a larger number of references per symbol type which is counted by said number-of-references counting unit from among the symbols existing in said map to write the image of each of the number of symbols having a larger number of references in a texture generated by said texture generating unit;
a symbol information storage unit for storing symbol information showing a type and a write position of each of the symbols whose images are written in the texture by said symbol image writing unit;
a polygon generating unit for generating vertices of a 3D polygon according to display coordinates of a symbol to be drawn;
a write checking unit for referring to the symbol information stored in said symbol information storage unit to check to see whether or not an image of a symbol of same type as the symbol to be drawn is written in the texture;
a texture coordinate setting unit for, when said write checking unit determines that an image of a symbol of same type as the symbol to be drawn is written in the texture, setting the write position of said symbol in said texture to the vertices of the 3D polygon generated by said polygon generating unit as texture coordinates, otherwise generating an original texture in which the image of the symbol to be drawn is drawn and setting coordinates of said texture to the vertices of the 3D polygon generated by said polygon generating unit; and
a polygon drawing unit for drawing the 3D polygon in which the texture coordinates are set by said texture coordinate setting unit.

2. The map symbol drawing device according to claim 1, wherein the texture coordinate setting unit includes an original texture generating unit for, when said write checking unit does not determine that an image of a symbol of same type as the symbol to be drawn is written in the texture, generating an original texture in which the image of the symbol to be drawn is drawn, and a texture-to-be-used switching unit for, when said write checking unit determines that an image of a symbol of same type as the symbol to be drawn is written in the texture, switching a texture used at a time of polygon drawing to said texture, otherwise switching the texture used at a time of polygon drawing to the original texture generated by said original texture generating unit, wherein the texture coordinate setting unit sets the write position of the symbol in the texture to which is switched by said texture-to-be-used switching unit to the vertices of the 3D polygon generated by said polygon generating unit as the texture coordinates, and said texture-to-be-used switching unit does not switch the texture used at a time of polygon drawing to any other texture when the texture in which the image of the symbol of the same type as the symbol to be drawn is written is same as a texture used at a time of previous polygon drawing.

3. The map symbol drawing device according to claim 1, wherein the texture generating unit, the number-of-references counting unit, the symbol image writing unit, and the symbol information storage unit carry out their respective processes only when the map symbol drawing device is started.

4. The map symbol drawing device according to claim 1, wherein the polygon generating unit, the write checking unit, the texture coordinate setting unit, and the polygon drawing unit carry out their respective processes when drawing of the map is updated.

5. The map symbol drawing device according to claim 1, wherein the number-of-references counting unit counts the number of references per symbol type of the symbols existing in the map for each map scale, the symbol image writing unit acquires images of a number of symbols corresponding to a specified scale and having a larger number of references per symbol type from among symbols existing in a map having the specified scale to write the image of each of the number of symbols having a larger number of references in the texture generated by the texture generating unit, and the symbol information storage unit stores the symbol information showing the type and the write position of each of the symbols whose images are written in the texture by said symbol image writing unit.

6. The map symbol drawing device according to claim 5, wherein the texture generating unit and the number-of-references counting unit carry out their respective processes only when the map symbol drawing device is started.

7. The map symbol drawing device according to claim 5, wherein the symbol image writing unit and the symbol information storage unit carry out their respective processes only when the scale is changed.

8. The map symbol drawing device according to claim 1, wherein the number-of-references counting unit counts the number of references per symbol type of the symbols existing in the map for each map area, the symbol image writing unit acquires images of a number of symbols corresponding to a certain area and having a larger number of references per symbol type from among symbols existing in maps of a plurality of areas to write the image of each of the number of symbols having a larger number of references in the texture generated by the texture generating unit, and the symbol information storage unit stores the symbol information showing the type and the write position of each of the symbols whose images are written in the texture by said symbol image writing unit.

9. The map symbol drawing device according to claim 8, wherein the texture generating unit, the number-of-references counting unit, the symbol image writing unit, and the symbol information storage unit carry out their respective processes only when the map symbol drawing device is started.

* * * * *